United States Patent
Zhang et al.

(10) Patent No.: US 12,438,778 B2
(45) Date of Patent: Oct. 7, 2025

(54) NETWORK MANAGEMENT METHOD AND APPARATUS

(71) Applicant: Huawei Technologies Co., Ltd., Shenzhen (CN)

(72) Inventors: Jian Zhang, Shenzhen (CN); Xiaocheng Xing, Xi'an (CN); Man Wang, Shanghai (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 18/620,157

(22) Filed: Mar. 28, 2024

(65) Prior Publication Data

US 2024/0259267 A1     Aug. 1, 2024

Related U.S. Application Data

(63) Continuation of application No. PCT/CN2022/121771, filed on Sep. 27, 2022.

(30) Foreign Application Priority Data

Sep. 30, 2021 (CN) .......................... 202111163413.8

(51) Int. Cl.
  *H04L 41/0894* (2022.01)
  *H04L 41/0816* (2022.01)

(52) U.S. Cl.
  CPC ...... *H04L 41/0894* (2022.05); *H04L 41/0816* (2013.01)

(58) Field of Classification Search
  CPC .................. H04L 14/0894; H04L 14/0816

(Continued)

(56) References Cited

U.S. PATENT DOCUMENTS

| 2018/0316564 A1* | 11/2018 | Senarath | H04L 41/5051 |
| 2020/0044943 A1* | 2/2020 | Bor-Yaliniz | H04L 41/40 |

(Continued)

FOREIGN PATENT DOCUMENTS

| CN | 113132132 A | 7/2021 | |
| WO | WO-2018170135 A1 * | 9/2018 | ......... H04L 41/0813 |
| WO | 2021064254 A1 | 4/2021 | |
| WO | WO-2021152347 A1 * | 8/2021 | ......... H04L 41/0806 |
| WO | WO-2022011578 A1 * | 1/2022 | ......... H04L 41/0894 |

OTHER PUBLICATIONS

3rd Generation Partnership Project; Technical Specification Group Services and System Aspects; Management and orchestration; Management Services for Communication Service Assurance; Stage 2 and stage 3 (Release 16). 3GPP TS 28.536 V0.2.0 (Nov. 2019). total 10 pages.

(Continued)

*Primary Examiner* — Umar Cheema
(74) *Attorney, Agent, or Firm* — Slater Matsil, LLP

(57) ABSTRACT

This application provides a network management method and apparatus, to implement a service level specification SLS goal of a network slice and/or a network slice subnet. The method includes: A first network management producer entity receives first management policy information, and performs a first management policy in the first management policy information which is corresponding to a first closed-loop management process. The first closed-loop management process has an association relationship with at least one second closed-loop management process which is corresponding to second management policy information, wherein the first management policy information and at least one piece of second management policy information are for implementing assurance goals of the first closed-loop management process and the at least one second closed-loop management process. The first closed-loop management process and the second closed-loop management process are (Continued)

respectively for implementing SLS goals of the first managed object and a second managed object.

20 Claims, 6 Drawing Sheets

(58) Field of Classification Search
USPC .......................................................... 709/220
See application file for complete search history.

(56) References Cited

U.S. PATENT DOCUMENTS

| | | | |
|---|---|---|---|
| 2022/0021590 A1* | 1/2022 | Seetharaman | H04L 41/0895 |
| 2025/0147189 A1* | 5/2025 | Gunnarsson | G01S 5/011 |
| 2025/0150851 A1* | 5/2025 | Kienig | H04W 60/04 |
| 2025/0150873 A1* | 5/2025 | Wallentin | H04B 7/0413 |

OTHER PUBLICATIONS

3rd Generation Partnership Project; Technical Specification Group Services and System Aspects; Management and orchestration; Management Services for Communication Service Assurance; Requirements (Release 16). 3GPP TS 28.535 V1.1.0 (Mar. 2020). total 17 pages.

3rd Generation Partnership Project; Technical Specification Group Services and System Aspects; Management and orchestration; Concepts, use cases and requirements (Release 16). 3GPP TS 28.530 V16.1.0 (Dec. 2019). total 30 pages.

3rd Generation Partnership Project; Technical Specification Group Services and System Aspects; Management and orchestration; Architecture framework (Release 16). 3GPP TS 28.533 V16.2.0 (Dec. 2019). total 29 pages.

3rd Generation Partnership Project; Technical Specification Group Services and System Aspects; Management and orchestration; 5G Network Resource Model (NRM); Stage 2 and stage 3 (Release 16). 3GPP TS 28.541 V16.3.0 (Dec. 2019). total 327 pages.

Lenovo et al: "Add use case for limiting actions of a AL," 3GPP TSG SA WG5 Meeting 134-e S5-206368 electronic meeting, online, Nov. 16-25, 2020. total 3 pages.

3GPP TS 28.536 V17.0.0 3rd Generation Partnership Project; Technical Specification Group Services and System Aspects; Management and orchestration; Management services for communication service assurance; Stage 2 and stage 3 (Release 17), Jun. 2021, total 24 pages.

* cited by examiner

NETWORK MANAGEMENT METHOD AND APPARATUS

CROSS-REFERENCE TO RELATED APPLICATIONS

This application is a continuation of International Application No. PCT/CN2022/121771, filed on Sep. 27, 2022, which claims priority to Chinese Patent Application No. 202111163413.8, filed on Sep. 30, 2021. The disclosures of the aforementioned applications are hereby incorporated by reference in their entireties.

TECHNICAL FIELD

This application relates to the communication field, and in particular, to a network management method and apparatus.

BACKGROUND

Closed-loop service level specification (SLS) assurance (closed loop SLS assurance, COSLA) (which may also be referred to as a closed-loop management process) can be used to monitor closed-loop assurance goal completion and resource usage, and adjust resources associated with a network slice or a network slice subnet, to meet one or more closed-loop assurance goals.

A network slice is a cross-domain network, and a plurality of closed-loop management processes are required to complete an SLS assurance goal of the network slice. With reference to FIG. 1, end-to-end SLS assurance for a network slice is provided through COSLA deployed at a 3rd generation partnership project (3GPP) cross-domain level, to ensure service experience of the network slice; SLS assurance for a network slice subnet in a radio access network (RAN) domain is provided through COSLA deployed in the RAN domain; and SLS assurance for a network slice subnet in a core network (CN) domain is provided through COSLA deployed in the CN domain. The COSLA may include management services (MnS(s)) such as monitoring, analysis, decision, and execution.

However, no corresponding technical solution is provided in the industry for how to specifically implement an SLS goal of a network slice and/or a network slice subnet.

SUMMARY

This application provides a network management method and apparatus, to implement an SLS goal of a network slice and/or a network slice subnet.

To achieve the foregoing objective, the following technical solutions are used in this application.

According to a first aspect, a network management method is provided. The network management method may be applied to a first network management producer entity, the first network management producer entity is configured to manage a first closed-loop management process, the first closed-loop management process is a management process for implementing an SLS goal of a first managed object, the first managed object is a resource or a service managed in the first closed-loop management process, a second closed-loop management process is a management process for implementing a service level specification SLS goal of a second managed object, the second closed-loop management process is managed by a second network management producer entity, and the second managed object is a resource or a service managed in the second closed-loop management process.

The network management method includes: receiving a first message from a network management consumer entity, and performing one or more first management policies in first management policy information. The first message includes the first management policy information, the first management policy information is management policy information corresponding to the first closed-loop management process, there is an association relationship between the first closed-loop management process and at least one second closed-loop management process, management policy information corresponding to the second closed-loop management process is second management policy information, the first management policy information and at least one piece of second management policy information are for implementing an assurance goal of the first closed-loop management process and an assurance goal of the at least one second closed-loop management process, and the first management policy information includes the one or more first management policies.

Based on the network management method provided in the first aspect, the first network management producer entity receives the first management policy information, and performs the one or more first management policies in the first management policy information. The first management policy information is the management policy information corresponding to the first closed-loop management process, there is the association relationship between the first closed-loop management process and the at least one second closed-loop management process, the management policy information corresponding to the second closed-loop management process is the second management policy information, the first management policy information and the at least one piece of second management policy information are for implementing the assurance goal of the first closed-loop management process and the assurance goal of the at least one second closed-loop management process, the first managed object is the resource or the service managed in the first closed-loop management process, and the first closed-loop management process is a management process for implementing the SLS goal of the first managed object. In this way, the first network management producer entity can implement the SLS goal of the first managed object (for example, a network slice and/or a network slice subnet).

In a possible design, the first management policy information may include one or more pieces of first action indication information, and the first action indication information may indicate the first network management producer entity to set configuration information of the first managed object corresponding to the first closed-loop management process. In this way, a network management producer may perform an operation indicated by the one or more pieces of first action indication information, so that performance of a closed-loop management process can meet an assurance goal.

In a possible design, the first management policy information may further include one or more pieces of condition information and/or one or more pieces of event information. One piece of condition information corresponds to at least one piece of first action indication information, and one piece of event information corresponds to at least one piece of first action indication information. In other words, when one piece of condition information and/or one piece of event information are/is met, the network management producer may perform the operation indicated by the one or more pieces of first action indication information, so that the first closed-loop management process can meet the assurance goal.

Optionally, the condition information in the first management policy information may include a relationship between performance of the first managed object corresponding to the first closed-loop management process and a performance threshold. The event information may include one or more of the following: a notification event corresponding to the first managed object corresponding to the first closed-loop management process, and/or a notification event corresponding to a managed object other than the first managed object corresponding to the first closed-loop management process, a notification event generated by a network management producer entity, and a notification event generated by a network management producer entity other than the network management producer entity.

In a possible design, the performing one or more first management policies in first management policy information may include: setting, based on the first action indication information, configuration information of the first managed object corresponding to the first closed-loop management process. In this way, the assurance goal corresponding to the first closed-loop management process can be ensured.

In a possible design, the performing one or more first management policies in first management policy information may include: when the condition information and/or the event information are/is met, setting, based on the first action indication information, configuration information of the first managed object corresponding to the first closed-loop management process.

In a possible design, an entity receiving the first message is the first network management producer entity, a managed object corresponding to the first closed-loop management process is the first managed object, an entity configured to manage the second closed-loop management process is the second network management producer entity, and the first message may further include one or more of the following: an identifier of the second network management producer entity, an identifier of the second closed-loop management process, and the assurance goal of the first closed-loop management process.

In this way, a plurality of network management producer entities (for example, the first network management producer entity and the second network management producer entity) may not only implement assurance goals of respective closed-loop management processes based on respective management policy information (for example, the first network management producer entity corresponds to the first management policy information, and the second network management producer entity corresponds to the second management policy information), but also further negotiate assurance goals of respective closed-loop management processes based on the received first message.

Optionally, the second network management producer entity may perform a function similar to that of the first network management producer entity. For example, the second network management producer entity receives the second management policy information from the network management consumer entity, and performs one or more second management policies in the second management policy information. An implementation of the second management policy information is similar to a specific implementation of the first management policy information, and a main difference lies in that the first closed-loop management process is replaced with the second closed-loop management process. For example, the second management policy information may include one or more pieces of first action indication information, and the first action indication information may indicate the network management producer entity to set configuration information of the second managed object corresponding to the second closed-loop management process. For details, refer to the implementation of the first management policy information. Details are not described one by one.

In a possible design, the first management policy information may further include one or more pieces of first sub-action indication information, the first sub-action indication information may indicate the first network management producer entity to send first notification information and/or a first operation result to the second network management producer entity, and the performing one or more first management policies in first management policy information may include: sending a first collaboration message to the second network management producer entity based on the identifier of the second network management producer entity and the first sub-action indication information. The first collaboration message may include the first notification information and/or the first operation result. The first notification information may include an assurance goal that is of the second closed-loop management process and that the network management consumer entity expects the second network management producer entity to use. The first operation result may be obtained by the first network management producer entity based on the first action indication information, or the first operation result may be obtained by the first network management producer entity based on the first action indication information and one or more of the condition information and the event information. In this way, the first network management producer entity may implement a collaborative operation with the second network management producer entity, to meet an assurance goal corresponding to a closed-loop management process.

Optionally, similar to the first management policy information, the second management policy information may further include one or more pieces of first sub-action indication information, and the first sub-action indication information may indicate the second network management producer entity to send second notification information and/or a second operation result to the first network management producer entity. The second network management producer entity may send a second collaboration message to the first network management producer entity based on an identifier of the first network management producer entity and the first sub-action indication information.

In a possible design, the network management method provided in the first aspect may further include: sending a second message to the network management consumer entity. The second message may include the first operation result and/or first modification request information. The first operation result may be obtained by the first network management producer entity based on the first action indication information, or the first operation result may be obtained by the first network management producer entity based on the first action indication information and the one or more of the condition information and the event information. The first modification request information may be used to request to modify the first management policy information and/or the assurance goal of the first closed-loop management process. In this way, the network management consumer entity may adjust the management policy information and/or the assurance goal of the first closed-loop management process based on the first operation result and/or the modification request.

In a possible design, the first modification request information may be determined by the first network management producer entity based on the second notification information, the second operation result, and/or the first operation result of the first network management producer entity. The second notification information may include an assurance goal that is of the first closed-loop management process and that the network management consumer entity expects the first network management producer entity to use. The second operation result may be obtained by the second network management producer entity based on the first action indication information, or the second operation result may be obtained by the second network management producer entity based on the first action indication information and one or more of the condition information and the event information.

In this way, the first network management producer entity may determine, based on the assurance goal that the network management consumer entity expects the first network management producer entity to use, the second operation result of the second network management producer entity, and/or the first operation result of the first network management producer entity, whether to request to modify the assurance goal and/or the management policy information of the first closed-loop management process, and may further determine the expected assurance goal and/or expected management policy information.

In a possible design, the network management method provided in the first aspect may further include: receiving a second collaboration message from the second network management producer entity. The second collaboration message may include the second notification information and/or the second operation result. In this way, the second network management producer entity may perform a collaborative operation with the first network management producer entity, so that performance corresponding to a closed-loop management process meets an assurance goal.

In a possible design, the network management method provided in the first aspect may further include: receiving new first management policy information and/or a new assurance goal of the first closed-loop management process from the network management consumer entity. In this way, the first network management producer entity may further implement the SLS goal of the first managed object based on the new management policy information and/or the new assurance goal.

In a possible design, the first operation result may include one or more of the following: a first performance result, an identifier of first management policy information corresponding to the first performance result, condition information corresponding to the first performance result, event information corresponding to the first performance result, and first action indication information corresponding to the first performance result. The first performance result may include a result of performance of the first managed object.

In a possible design, there may be one or more first closed-loop management processes. Optionally, there may be one or more second closed-loop management processes.

In a possible design, the association relationship may include a connection relationship, an inclusion relationship, or a sharing relationship.

It is to be noted that the second network management producer entity may perform a function similar to that of the first network management producer entity in the method shown in the first aspect. A main difference lies in that the first closed-loop management process is replaced with the second closed-loop management process, and the first network management producer entity is replaced with the second network management producer entity. Details are not described herein again.

According to a second aspect, a network management method is provided. The network management method is applied to a network management consumer entity, and includes: determining N pieces of management policy information based on association relationship information and assurance goals of N closed-loop management processes, and sending a first message to at least two network management producer entities. The association relationship information includes an association relationship between the N closed-loop management processes, N is an integer greater than 1, the closed-loop management process is a management process for implementing a service level specification SLS goal of a managed object, the managed object is a resource or a service managed in the closed-loop management process, the N pieces of management policy information are for implementing the assurance goals of the N closed-loop management processes, and the N closed-loop management processes are in a one-to-one correspondence with N managed objects. The first message includes management policy information, the network management producer entity is configured to manage a closed-loop management process, and the management policy information includes one or more management policies.

Optionally, a main difference between the N pieces of management policy information lies in that the N pieces of management policy information respectively correspond to different closed-loop management processes. For example, management policy information 1 corresponds to a closed-loop management process 1, and management policy information 2 corresponds to a closed-loop management process 2.

In a possible design, the management policy information may include one or more pieces of first action indication information, and the first action indication information may indicate the network management producer entity to set configuration information of the managed object corresponding to the closed-loop management process.

In a possible design, the management policy information may further include one or more pieces of condition information and/or one or more pieces of event information. One piece of condition information corresponds to at least one piece of first action indication information, and one piece of event information corresponds to at least one piece of first action indication information.

Optionally, the condition information may include a latency threshold corresponding to the managed object corresponding to the closed-loop management process, and/or a throughput threshold corresponding to the managed object corresponding to the closed-loop management process. The event information may include one or more of the following: a notification event corresponding to the managed object corresponding to the closed-loop management process, and/or a notification event corresponding to a managed object other than the managed object corresponding to the closed-loop management process, a notification event generated by a network management producer entity, and a notification event generated by a network management producer entity other than the network management producer entity.

In a possible design, an entity receiving the first message is a first network management producer entity, a closed-loop management process corresponding to the first network management producer entity is a first closed-loop management process, a managed object corresponding to the first closed-loop management process is a first managed object, a closed-loop management process having an association relationship with the first closed-loop management process is a second closed-loop management process, an entity configured to manage the second closed-loop management process is a second network management producer entity, and the first message may further include one or more of the following: an identifier of the second network management producer entity, an identifier of the second closed-loop management process, and an assurance goal of the first closed-loop management process.

In a possible design, the management policy information may further include one or more pieces of first sub-action indication information, the first sub-action indication information may indicate the first network management producer entity to send first notification information and/or a first operation result to the second network management producer entity, the first notification information may include an assurance goal that is of the second closed-loop management process and that the network management consumer entity expects the second network management producer entity to use, and the first operation result may be obtained by the first network management producer entity based on the first action indication information, or the first operation result may be obtained by the first network management producer entity based on the first action indication information and one or more of the condition information and the event information.

In a possible design, the network management method provided in the second aspect may further include: receiving a second message from the network management producer entity. The second message may include the first operation result and/or first modification request information, the first operation result may be obtained by the network management producer entity based on the first action indication information, or the first operation result may be obtained by the network management producer entity based on the first action indication information and the one or more of the condition information and the event information, and the first modification request information may be used to request to modify the management policy information and/or the assurance goal of the closed-loop management process.

In a possible design, the network management method provided in the second aspect may further include: determining new management policy information and/or a new assurance goal of the closed-loop management process based on a first operation result of at least one network management producer entity and/or first modification request information of the at least one network management producer entity.

In a possible design, the network management method provided in the second aspect may further include: sending the new management policy information and/or the new assurance goal of the closed-loop management process to the network management producer entity.

In a possible design, the assurance goals of the N closed-loop management processes may be determined by the network management consumer entity based on requirement information of the N managed objects.

In a possible design, the association relationship information may be determined by the network management consumer entity based on an association relationship between the managed objects respectively corresponding to the N closed-loop management processes.

In a possible design, the network management producer entity may manage one or more closed-loop management processes.

In a possible design, the association relationship may include a connection relationship, an inclusion relationship, or a sharing relationship.

In addition, for technical effects of the network management method in the second aspect, refer to the technical effects of the network management method in the first aspect. Details are not described herein again.

According to a third aspect, a network management apparatus is provided. The network management apparatus is configured to manage a first closed-loop management process, where the first closed-loop management process is a management process for implementing an SLS goal of a first managed object, the first managed object is a resource or a service managed in the first closed-loop management process, a second closed-loop management process is a management process for implementing an SLS goal of a second managed object, the second closed-loop management process is managed by a second network management producer entity, and the second managed object is a resource or a service managed in the second closed-loop management process.

The network management apparatus includes a transceiver module and a processing module. The transceiver module is configured to receive a first message from a network management consumer entity. The processing module is configured to perform the one or more first management policies in the first management policy information. The first message includes the first management policy information, the first management policy information is management policy information corresponding to the first closed-loop management process, there is an association relationship between the first closed-loop management process and at least one second closed-loop management process, management policy information corresponding to the second closed-loop management process is second management policy information, the first management policy information and at least one piece of second management policy information are for implementing an assurance goal of the first closed-loop management process and an assurance goal of the at least one second closed-loop management process, and the first management policy information includes the one or more first management policies.

In a possible design, the first management policy information may include one or more pieces of first action indication information, and the first action indication information may indicate the network management apparatus to set configuration information of the first managed object corresponding to the first closed-loop management process.

In a possible design, the first management policy information may further include one or more pieces of condition information and/or one or more pieces of event information. One piece of condition information corresponds to at least one piece of first action indication information, and one piece of event information corresponds to at least one piece of first action indication information.

Optionally, the condition information may include a relationship between performance of the first managed object corresponding to the first closed-loop management process and a performance threshold. The event information may include one or more of the following: a notification event corresponding to the first managed object corresponding to the first closed-loop management process, and/or a notification event corresponding to a managed object other than the first managed object corresponding to the first closed-loop management process, a notification event generated by the network management apparatus, and a notification event generated by a first network management apparatus other than the network management apparatus.

In a possible design, the processing module is further configured to set, based on the first action indication information, configuration information of the first managed object corresponding to the first closed-loop management process.

In a possible design, when the condition information and/or the event information are/is met, the processing module is further configured to set, based on the first action indication information, configuration information of the first managed object corresponding to the first closed-loop management process.

In a possible design, an entity receiving the first message is the first network management apparatus, a managed object corresponding to the first closed-loop management process is the first managed object, an entity configured to manage the second closed-loop management process is the second network management producer entity, and the first message may further include one or more of the following: an identifier of the second network management producer entity, an identifier of the second closed-loop management process, and the assurance goal of the first closed-loop management process.

In a possible design, the first management policy information may further include one or more pieces of first sub-action indication information, the first sub-action indication information may indicate the first network management apparatus to send first notification information and/or a first operation result to the second network management producer entity, and the transceiver module is further configured to send a first collaboration message to the second network management producer entity based on the identifier of the second network management producer entity and the first sub-action indication information. The first collaboration message may include the first notification information and/or the first operation result. The first notification information may include an assurance goal that is of the second closed-loop management process and that the network management consumer entity expects the second network management producer entity to use. The first operation result may be obtained by the first network management apparatus based on the first action indication information, or the first operation result may be obtained by the first network management apparatus based on the first action indication information and one or more of the condition information and the event information.

In a possible design, the transceiver module is further configured to send a second message to the network management consumer entity. The second message may include the first operation result and/or first modification request information. The first operation result may be obtained by the first network management apparatus based on the first action indication information, or the first operation result may be obtained by the first network management apparatus based on the first action indication information and the one or more of the condition information and the event information. The first modification request information may be used to request to modify the first management policy information and/or the assurance goal of the first closed-loop management process.

In a possible design, the first modification request information may be determined by the first network management apparatus based on second notification information and/or a second operation result. The second notification information may include an assurance goal that is of the first closed-loop management process and that the network management consumer entity expects the first network management apparatus to use. The second operation result may be obtained by the second network management producer entity based on the first action indication information, or the second operation result may be obtained by the second network management producer entity based on the first action indication information and one or more of the condition information and the event information.

In a possible design, the transceiver module is further configured to receive a second collaboration message from the second network management producer entity. The second collaboration message may include the second notification information and/or the second operation result.

In a possible design, the transceiver module is further configured to receive new first management policy information and/or a new assurance goal of the first closed-loop management process from the network management consumer entity.

In a possible design, the first operation result may include one or more of the following: a first performance result, an identifier of first management policy information corresponding to the first performance result, condition information corresponding to the first performance result, event information corresponding to the first performance result, and first action indication information corresponding to the first performance result. The first performance result may include a result of performance of the first managed object.

In a possible design, the network management apparatus may manage one or more closed-loop management processes.

In a possible design, the association relationship may include a connection relationship, an inclusion relationship, or a sharing relationship.

It is to be noted that the transceiver module in the third aspect may include a receiving module and a sending module. The receiving module is configured to receive data and/or signaling from the network management consumer entity and/or another network management producer entity; and the sending module is configured to send data and/or signaling to the network management consumer entity and/or another network management producer entity. A specific implementation of the transceiver module is not specifically limited in this application.

Optionally, the network management apparatus according to the third aspect may further include a storage module, and the storage module stores a program or instructions. When the processing module executes the program or the instructions, the network management apparatus according to the third aspect can perform the method according to the first aspect.

It is to be noted that the network management apparatus in the third aspect may be a network management producer entity, or may be a chip (system) or another part or component that can be disposed in a network management producer entity. This is not limited in this application.

In addition, for technical effects of the network management apparatus in the third aspect, refer to the technical effects of the network management method in the first aspect. Details are not described herein again.

According to a fourth aspect, a network management apparatus is provided. The network management apparatus includes a transceiver module and a processing module. The processing module is configured to determine N pieces of management policy information based on association relationship information and assurance goals of N closed-loop management processes. The transceiver module is configured to send a first message to at least two network management producer entities. The association relationship information includes an association relationship between the N closed-loop management processes, N is an integer greater than 1, the closed-loop management process is a management process for implementing an SLS goal of a managed object, the managed object is a resource or a service managed in the closed-loop management process, the N pieces of management policy information are for implementing the assurance goals of the N closed-loop management processes, and the N closed-loop management processes are in a one-to-one correspondence with N managed objects. The first message includes management policy information, the network management producer entity is configured to manage a closed-loop management process, and the management policy information includes one or more management policies.

In a possible design, the management policy information may include one or more pieces of first action indication information, and the first action indication information may indicate the network management producer entity to set configuration information of the managed object corresponding to the closed-loop management process.

In a possible design, the management policy information may further include one or more pieces of condition information and/or one or more pieces of event information. One piece of condition information corresponds to at least one piece of first action indication information, and one piece of event information corresponds to at least one piece of first action indication information.

Optionally, the condition information may include a latency threshold corresponding to the managed object corresponding to the closed-loop management process, and/or a throughput threshold corresponding to the managed object corresponding to the closed-loop management process. The event information may include one or more of the following: a notification event corresponding to the managed object corresponding to the closed-loop management process, and/or a notification event corresponding to a managed object other than the managed object corresponding to the closed-loop management process, a notification event generated by a network management producer entity, and a notification event generated by a network management producer entity other than the network management producer entity.

In a possible design, an entity receiving the first message is a first network management producer entity, a closed-loop management process corresponding to the first network management producer entity is a first closed-loop management process, a managed object corresponding to the first closed-loop management process is a first managed object, a closed-loop management process having an association relationship with the first closed-loop management process is a second closed-loop management process, an entity configured to manage the second closed-loop management process is a second network management producer entity, and the first message may further include one or more of the following: an identifier of the second network management producer entity, an identifier of the second closed-loop management process, and an assurance goal of the first closed-loop management process.

In a possible design, the management policy information may further include one or more pieces of first sub-action indication information, the first sub-action indication information may indicate the first network management producer entity to send first notification information and/or a first operation result to the second network management producer entity, the first notification information may include an assurance goal that is of the second closed-loop management process and that the network management apparatus expects the second network management producer entity to use, and the first operation result may be obtained by the first network management producer entity based on the first action indication information, or the first operation result may be obtained by the first network management producer entity based on the first action indication information and one or more of the condition information and the event information.

In a possible design, the transceiver module is further configured to receive a second message from the network management producer entity. The second message may include the first operation result and/or first modification request information, the first operation result may be obtained by the network management producer entity based on the first action indication information, or the first operation result may be obtained by the network management producer entity based on the first action indication information and the one or more of the condition information and the event information, and the first modification request information may be used to request to modify the management policy information and/or the assurance goal of the closed-loop management process.

In a possible design, the processing module is further configured to determine new management policy information and/or a new assurance goal of the closed-loop management process based on a first operation result of at least one network management producer entity and/or first modification request information of the at least one network management producer entity.

In a possible design, the transceiver module is further configured to send the new management policy information and/or the new assurance goal of the closed-loop management process to the network management producer entity.

In a possible design, the assurance goals of the N closed-loop management processes may be determined by the network management apparatus based on requirement information of the N managed objects.

In a possible design, the association relationship information may be determined by the network management apparatus based on an association relationship between the managed objects respectively corresponding to the N closed-loop management processes.

In a possible design, the network management producer entity may manage one or more closed-loop management processes.

In a possible design, the association relationship may include a connection relationship, an inclusion relationship, or a sharing relationship.

It is to be noted that the transceiver module in the fourth aspect may include a receiving module and a sending module. The receiving module is configured to receive data and/or signaling from a network management producer entity; and the sending module is configured to send data and/or signaling to a network management producer entity. A specific implementation of the transceiver module is not specifically limited in this application.

Optionally, the network management apparatus according to the fourth aspect may further include a storage module, and the storage module stores a program or instructions. When the processing module executes the program or the instructions, the network management apparatus according to the fourth aspect can perform the method according to the second aspect.

It is to be noted that the network management apparatus in the fourth aspect may be a network management consumer entity, or may be a chip (system) or another part or component that can be disposed in a network management consumer entity. This is not limited in this application.

In addition, for technical effects of the network management apparatus in the fourth aspect, refer to the technical effects of the network management method in the second aspect. Details are not described herein again.

According to a fifth aspect, a network management apparatus is provided. The network management apparatus includes a processor, the processor is coupled to a memory, and the memory is configured to store a computer program.

The processor is configured to execute the computer program stored in the memory, so that the network management method according to any one of the possible implementations of the first aspect and the second aspect is performed.

In a possible design, the network management apparatus according to the fifth aspect may further include a transceiver. The transceiver may be a transceiver circuit or an input/output port. The transceiver may be used by the network management apparatus to communicate with another device.

It is to be noted that the input port may be configured to implement a receiving function in the first aspect and the second aspect, and the output port may be configured to implement a sending function in the first aspect and the second aspect.

In this application, the network management apparatus according to the fifth aspect may be a network management consumer entity, a network management producer entity, or a chip or a chip system disposed inside a network management consumer entity or a network management producer entity.

In addition, for technical effects of the network management apparatus in the fifth aspect, refer to the technical effects of the network management method in any one of the implementations of the first aspect and the second aspect. Details are not described herein again.

According to a sixth aspect, a network management system is provided. The network management system includes a network management consumer entity, a first network management producer entity, and at least one second network management producer entity. The first network management producer entity is configured to manage a first closed-loop management process, the second network management producer entity is configured to manage a second closed-loop management process, the first closed-loop management process is a management process for implementing a service level specification SLS goal of a first managed object, the second closed-loop management process is a management process for implementing an SLS goal of a second managed object, the first managed object is a resource or a service managed in the first closed-loop management process, and the second managed object is a resource or a service managed in the second closed-loop management process.

The network management consumer entity is configured to determine N pieces of management policy information based on association relationship information and assurance goals of N closed-loop management processes, where the association relationship information includes an association relationship between the N closed-loop management processes, N is an integer greater than 1, the N pieces of management policy information are for implementing the assurance goals of the N closed-loop management processes, the N closed-loop management processes include the first closed-loop management process and at least one second closed-loop management process, the N pieces of management policy information include first management policy information and at least one piece of second management policy information, the first management policy information includes one or more first management policies, and the second management policy information includes one or more second management policies.

The network management consumer entity is further configured to: send the first management policy information to the first network management producer entity, and send the at least one piece of second management policy information to the at least one second network management producer entity.

The first network management producer entity is configured to receive the first management policy information from the network management consumer entity.

The first network management producer entity is further configured to perform the one or more first management policies in the first management policy information.

The second network management producer entity is configured to receive the second management policy information from the network management consumer entity.

The second network management producer entity is further configured to perform the one or more second management policies in the second management policy information.

Optionally, the network management consumer entity may be configured to implement the method according to the second aspect, the first network management producer entity may be configured to implement the method according to the first aspect, and the second network management producer entity may be configured to implement a method similar to the method according to the first aspect.

Alternatively, the network management system includes at least two network management apparatuses according to the third aspect and the network management apparatus according to the fourth aspect.

Optionally, there may be one or more network management consumer entities.

According to a seventh aspect, a chip system is provided. The chip system includes a logic circuit and an input/output port. The logic circuit is configured to implement a processing function in the first aspect and the second aspect, and the input/output port is configured to implement receiving and sending functions in the first aspect and the second aspect. Specifically, the input port may be configured to implement a receiving function in the first aspect and the second aspect, and the output port may be configured to implement a sending function in the first aspect and the second aspect.

In a possible design, the chip system further includes a memory, and the memory is configured to store program instructions and data for implementing functions in the first aspect and the second aspect.

The chip system may include a chip, or may include a chip and another discrete component.

According to an eighth aspect, a computer-readable storage medium is provided. The computer-readable storage medium stores a computer program or instructions. When the computer program or the instructions is/are run on a computer, the network management method according to any one of the possible implementations of the first aspect and the second aspect is performed.

According to a ninth aspect, a computer program product is provided, including a computer program or instructions. When the computer program or the instructions is/are run on a computer, the network management method according to any one of the possible implementations of the first aspect and the second aspect is performed.

DETAILED DESCRIPTION OF ILLUSTRATIVE EMBODIMENTS

The following describes technical solutions of this application with reference to accompanying drawings.

The technical solutions in embodiments of this application may be applied to various network management systems, for example, a wireless fidelity (Wi-Fi) system, a vehicle-to-everything (V2X) communication system, a device-to-device (D2D) communication system, an internet of vehicles communication system, a 4th generation (4G) mobile communication system such as a long term evolution (LTE) system or a worldwide interoperability for microwave access (WiMAX) communication system, a 5th generation (5G) mobile communication system such as a new radio (NR) system, and a future communication system such as a 6th generation (6G) mobile communication system.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, terms such as "example" and "for example" are used to represent giving an example, an illustration, or a description. Any embodiment or design scheme described as an "example" in this application should not be explained as being more preferred or having more advantages than another embodiment or design scheme. Specifically, the term "example" is used to present a concept in a specific manner.

The network architecture and the service scenario described in embodiments of this application are intended to describe the technical solutions in embodiments of this application more clearly, and do not constitute a limitation on the technical solutions provided in embodiments of this application. A person of ordinary skill in the art may know that, with the evolution of the network architecture and the emergence of new service scenarios, the technical solutions provided in embodiments of this application are also applicable to similar technical problems.

Figure 2:
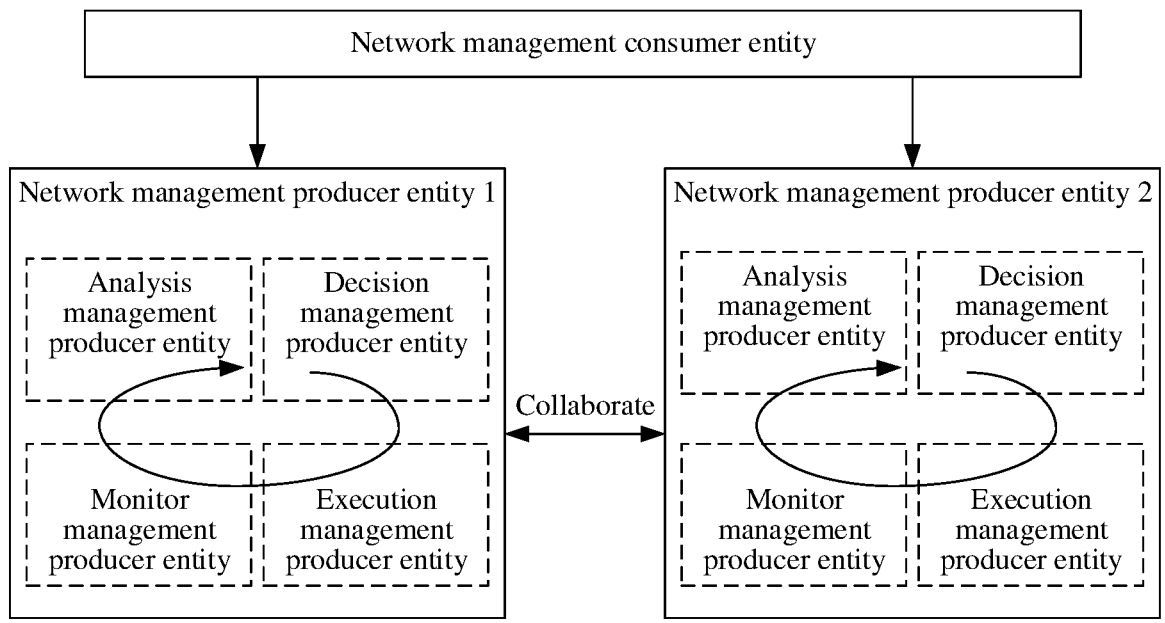
FIG. 2 is a schematic diagram of an architecture of another network management system according to an embodiment of this application.

For ease of understanding of embodiments of this application, a network management system shown in FIG. 2 is first used as an example to describe in detail a network management system applicable to embodiments of this application. For example, FIG. 2 is a schematic diagram of an architecture of a network management system to which a closed-loop management method is applicable according to an embodiment of this application.

As shown in FIG. 2, the network management system includes a network management consumer entity and at least two network management producer entities, for example, a network management producer entity 1 and a network management producer entity 2. Optionally, there may be one or more network management consumer entities.

The network management consumer entity is configured to interact with the network management producer entity, and may indicate the network management producer entity to manage a closed-loop management process. For example, the network management consumer entity may be configured to determine management policy information corresponding to the closed-loop management process, and send the management policy information to the network management producer entity corresponding to the closed-loop management process, so that the network management producer entity manages the closed-loop management process based on the management policy information. For details, refer to the following method shown in FIG. 3.

Figure 1:
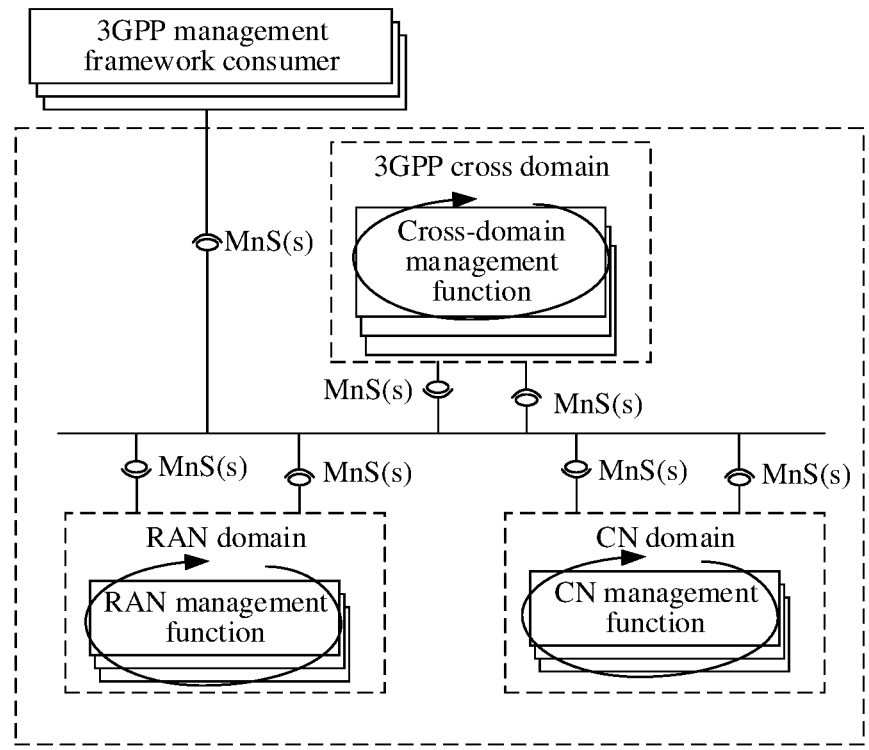
FIG. 1 is a schematic diagram of an architecture of a network management system according to an embodiment of this application.

It is to be noted that the network management consumer entity may also be referred to as a closed-loop (CL) management consumer entity, a closed-loop management consumer, a closed-loop management service consumer, a network management consumer, or a 3GPP management framework consumer (as shown in FIG. 1). This application uses the network management consumer entity as an example for description. The 3GPP management framework consumer may include a business support system (BSS), a vertical operational technology (OT) system (vertical OT system), or the like. The network management consumer entity may be a physical device, and a function of the network management consumer entity may be deployed on the physical device. For example, the network management consumer entity may be a function module deployed in the physical device.

The network management producer entity is configured to interact with the network management consumer entity and/or another network management producer entity, may receive management policy information from the network management consumer entity and coordinate and manage a closed-loop management process based on the management policy information, and may collaborate with another network management producer entity to manage the closed-loop management process. For details, refer to the following method shown in FIG. 3. One network management producer entity may manage one or more closed-loop management processes, and different network management producers may manage different closed-loop management processes. For example, the network management producer entity 1 is configured to manage a closed-loop management process 1, and the network management producer entity 2 is configured to manage a closed-loop management process 2.

It is to be noted that the network management producer entity may be referred to as a closed-loop management producer entity, a closed-loop management producer, a network management producer, a closed-loop management service producer, or the like. In this application, the network management producer entity is used as an example for description. The network management producer entity may be a physical device, and a function of the network management producer entity may be deployed on the physical device. For example, the network management producer entity may be a function module deployed in the physical device.

The network management consumer entity and the network management producer entity, or different network management producer entities may be deployed in a centralized manner or in a distributed manner. The network management consumer entity and the network management producer entity are used as an example. The network management consumer entity and the network management producer entity may be different hardware modules deployed in a same physical device, or may be different physical devices. A function of the network management consumer entity and a function of the network management producer entity may be deployed in different hardware modules in a same physical device, or may be deployed in different physical devices. This is not limited in this application. Centralized deployment or distributed deployment of different network management producer entities is similar to this. Details are not described in this application again.

Optionally, as shown in FIG. 2, the network management producer entity may include but is not limited to: a monitor (M) management producer entity, an analysis (A) management producer entity, a decision (D) management producer entity, and an execution (E) management producer entity. The monitor management producer entity is configured to perform a monitoring function to provide a monitoring service, the analysis management producer entity is configured to perform an analysis function to provide an analysis service, the decision management producer entity is configured to perform a decision function to provide a decision service, and the execution management producer entity is configured to implement an execution function to provide an execution service. The network management producer entity may schedule the decision management producer entity, the execution management producer entity, the monitor management producer entity, and the analysis management producer entity, to support a closed-loop management process.

It is to be noted that the decision management producer entity may be referred to as a decision management producer, the execution management producer entity may be referred to as an execution management producer, the monitor management producer entity may be referred to as a monitor management producer, and the analysis management producer entity may be referred to as an analysis management producer. In this application, the decision management producer entity, the execution management producer entity, the monitor management producer entity, and the analysis management producer entity are used as an example for description.

Similar to the network management consumer entity and the network management producer entity, the decision management producer entity, the execution management producer entity, the monitor management producer entity, and the analysis management producer entity may be deployed in a centralized manner (for example, deployed on a network management producer entity) or in a distributed manner. This is not limited in this application.

It is to be noted that the monitor management producer entity, the analysis management producer entity, the decision management producer entity, and the execution management producer entity may be deployed in a network management producer entity, or may be deployed in a physical device together with the network management producer entity, or may be deployed separately from the network management producer entity and perform communication through a management service repository entity (which may also be referred to as an integration fabric).

A function entity that provides a service may be referred to as a producer or a provider of the corresponding service, and a function entity that consumes a service may be referred to as a consumer of the corresponding service. In this application, each "producer" may also be a "consumer", and uses a service provided by another "producer".

It is to be noted that the network management method provided in embodiments of this application is applicable between any two nodes shown in FIG. 2, for example, between a closed-loop management consumer entity and a closed-loop management producer entity, or between at least two closed-loop management producer entities. For specific implementation, refer to the following method embodiments. Details are not described herein again.

It can be understood that FIG. 2 is merely a simplified schematic diagram of an example for ease of understanding. The network management system may further include another entity, which is not shown in FIG. 2.

To make embodiments of this application clearer, the following uniformly describes some content and concepts related to embodiments of this application.

A first part is a network slice and a network slice subnet.

The network slice is a logical network that provides a specific network capability and network attribute. The network slice supports a plurality of differentiated service types, for example, enhanced mobile broadband (eMBB), ultra-reliable and low latency communications (URLLC), and massive machine type communication (mMTC). One network slice may include a plurality of subnets, for example, a radio access network subnet, a transport network (TN) subnet, and a core network subnet.

One network slice instance (NSI) may include a network slice subnet instance (NSSI) of a radio network, an NSSI of a transport network, and an NSSI of a core network. The NSSI is a collection of network functions (NF) and required physical/virtual resources.

The NSI may include a group of network function instances and required resources (such as computing, storage, and network resources), and is used to form a deployed network slice. The NSI may be an end-to-end logical network instance, and provides a specific network capability and attribute. The NSI may include one or more NSSIs. The network function may be a processing function in a network, and may be used to define function behavior and an interface. The NF may include a physical network function (PNF) and a virtualized network function. The physical network function may be understood as a conventional network element, and the virtualized network function may be a virtualized network function.

In this application, the end-to-end logical network may be a network between a terminal device and an application server, for example, may include a radio access network, a core network, and/or a transport network.

The network slice subnet may represent a management aspect of a group of managed functions and required resources (such as computing, storage, and network resources), is a network subnet including one or more NFs and networking of the NFs, and may be a part of an end-to-end logical network, for example, a radio access network subnet, a core network subnet, or a transport subnet.

The network slice subnet instance may represent a management aspect of a group of managed function instances and used resources (such as computing, storage, and network resources). The NSSI includes one or more NFs and networking of the NFs. The NSSI may form a partial or complete NSI. The NSSI may be an NSSI of a radio network, an NSSI of a transport network, or an NSSI of a core network.

A second part is a managed object.

The managed object may be a resource or a service. The resource may include but is not limited to one or more of the following: a network element (for example, a resource related to a device or a network element, such as a radio spectrum, a computing resource, a storage resource, or a bandwidth resource), a subnet, and a network. The network may be a physical network, or may be a logical network, for example, a network slice or a network slice subnet. The service may refer to various services carried by a network, for example, a vertical industry service (such as programmable logic controller (PLC) control, video surveillance, and remote monitoring), a voice service, and a video service.

For example, the managed object may be one of the following items: a physical network, a service provided by the physical network, a logical network, a service provided by the logical network, a component (such as a device or a network element) of the physical network and the logical network, or a service provided by the component. Specifically, the managed object may be one of the following items: a communication service instance, a subnet (subnetwork), a network slice, a network slice subnet, an NSI, an NSSI, a communication service, a device, and a network element. Optionally, relative to a network management producer entity, the managed object may also be referred to as a managed network, a managed network entity (managed entity), a managed logical network, a managed network device, or the like. Similarly, compared with the managed object, the network management producer entity may also be referred to as a management entity or a management node. This is not specifically limited in this application. The following Table 1 lists network management producer entities and corresponding managed objects. Corresponding to different managed objects, network management producer entities may have different names.

TABLE 1

| Network management producer entity | Managed object |
| --- | --- |
| Communication service network management producer entity | Communication service or communication service instance |
| Network slice network management producer entity | Network slice or NSI |
| Network slice subnet network management producer entity | Network slice subnet or NSSI |

As shown in Table 1, the communication service or the communication service instance is a managed object of the communication service network management producer entity, the network slice or the network slice instance is a managed object of the network slice network management producer entity, and the network slice subnet or the network slice subnet instance is a managed object of the network slice subnet network management producer entity. The network slice subnet includes a network slice subnet in a radio access network domain, a network slice subnet in a core network domain, or a network slice subnet in a transport domain.

A third part is a closed-loop management process.

The closed-loop management process may be a management process for implementing an SLS goal of a managed object. For example, the closed-loop management process may include a function (for example, a monitoring function, an analysis function, a decision function, and an execution function), a management service (for example, monitoring, analysis, decision, and execution), a method, a process, and the like that are related to implementing the SLS goal of the managed object.

For example, the closed-loop management process may be referred to as closed-loop SLS assurance, a closed-loop management service, or the like, or the closed-loop management process may be referred to as a closed loop for short.

With reference to FIG. 1, a closed-loop management process that is deployed at a cross-domain level and that provides an end-to-end SLS assurance service of a network slice may be referred to as a network slice-level closed-loop management process, a closed-loop management process that is deployed in a RAN domain and that provides an SLS assurance service of a network slice subnet in the RAN domain may be referred to as a network slice subnet-level closed-loop management process, and a closed-loop management process that is deployed in a CN domain and that provides an SLS assurance service of a network slice subnet in the CN domain may be referred to as a network slice subnet-level closed-loop management process.

Figure 3:
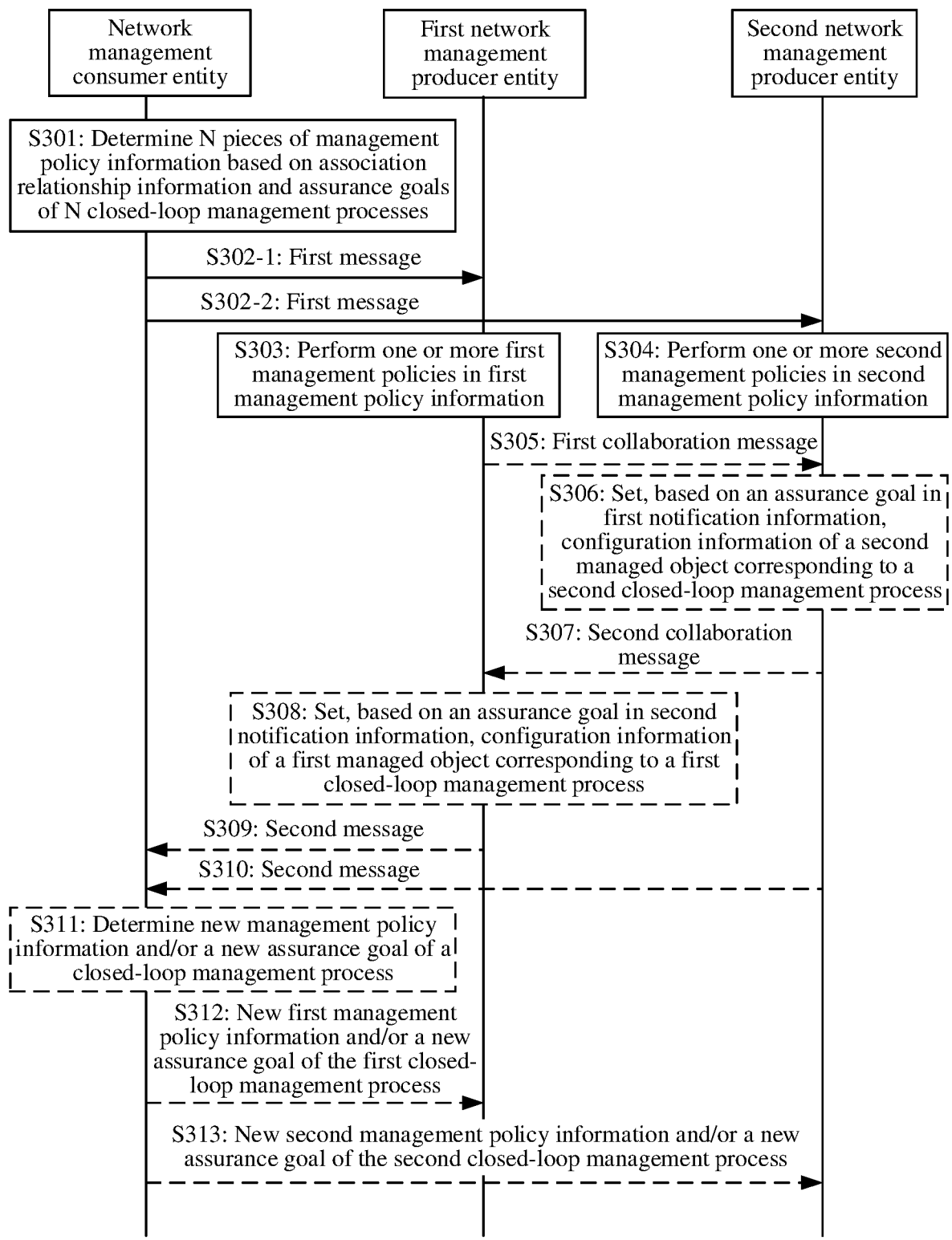
FIG. 3 is a schematic flowchart of a network management method according to an embodiment of this application.

It is to be noted that the network management method shown in FIG. 3 in this application is described by using a closed-loop management process.

For example, FIG. 3 is a schematic flowchart of a network management method according to an embodiment of this application. The network management method is applicable to communication between any two nodes shown in FIG. 2. For example, one network management producer entity manages one closed-loop management process.

As shown in FIG. 3, the network management method includes the following steps.

S301: A network management consumer entity determines N pieces of management policy information based on association relationship information and assurance goals of N closed-loop management processes.

For example, the association relationship information may include an association relationship between the N closed-loop management processes, N is an integer greater than 1, and the N closed-loop management processes are in a one-to-one correspondence with N managed objects.

Optionally, the association relationship between the N closed-loop management processes may include a connection relationship, an inclusion relationship, a sharing relationship, or the like.

Optionally, the N closed-loop management processes may be managed by N different network management producer entities.

For example, the N closed-loop management processes may include a first closed-loop management process and at least one second closed-loop management process. There is an association relationship between the first closed-loop management process and the at least one second closed-loop management process. The first closed-loop management process is managed by a first network management producer entity, and the second closed-loop management process is managed by a second network management producer entity.

For example, the N managed objects may include a first managed object and at least one second managed object, the first closed-loop management process corresponds to the first closed-loop management process, and the second closed-loop management process corresponds to the second closed-loop management process.

For example, a closed-loop management process may be a management process for implementing an SLS goal of a managed object. For details, refer to the description in the foregoing third part. Details are not described herein again.

For example, the first closed-loop management process may be a management process for implementing an SLS goal of the first managed object.

For another example, the second closed-loop management process may be a management process for implementing an SLS goal of the second managed object.

For example, a managed object may be a resource or a service managed in a closed-loop management process. For details, refer to the description in the foregoing second part. Details are not described herein again.

For example, the first managed object may be a resource or a service managed in the first closed-loop management process.

For another example, the second managed object may be a resource or a service managed in the second closed-loop management process.

In some embodiments, the association relationship information may be determined by the network management consumer entity based on an association relationship between the managed objects respectively corresponding to the N closed-loop management processes.

Figure 4:
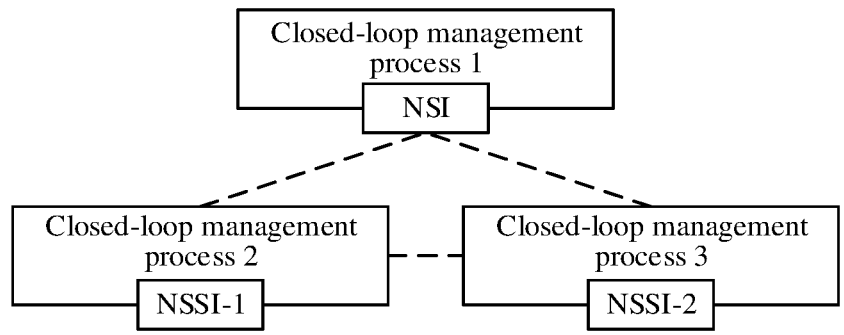
FIG. 4 is a schematic diagram of a managed object according to an embodiment of this application.

FIG. 4 is a schematic diagram of a managed object according to an embodiment of this application.

As shown in FIG. 4, managed objects include an NSI, an NSSI-1, and an NSSI-2. The NSI is a cross-domain network slice, the NSSI-1 is a slice subnet in a RAN domain 1, and the NSSI-2 is a slice subnet in a RAN domain 2. Alternatively, the NSSI-1 is a slice subnet in a RAN domain, and the NSSI-2 is a slice subnet in a CN domain. The NSI corresponds to a closed-loop management process 1, the NSSI-1 corresponds to a closed-loop management process 2, and the NSSI-2 corresponds to a closed-loop management process 3.

With reference to FIG. 4, the NSI includes the NSSI-1 and the NSSI-2, and the NSSI-1 is connected to the NSSI-2. In this case, an association relationship between the NSI and the NSSI-1 is an inclusion relationship, an association relationship between the NSI and the NSSI-2 is an inclusion relationship, and an association relationship between the NSSI-1 and the NSSI-2 is a connection relationship. Based on the association relationships between the NSI, the NSSI-1, and the NSSI-2, and a correspondence between the closed-loop management process 1 to the closed-loop management process 3 and the NSI, the NSSI-1, and the NSSI-2, it may be learned that association relationships between the closed-loop management process 1 to the closed-loop management process 3 are as follows: An association relationship between the closed-loop management process 1 and the closed-loop management process 2 is an inclusion relationship, an association relationship between the closed-loop management process 1 and the closed-loop management process 3 is an inclusion relationship, and an association relationship between the closed-loop management process 2 and the closed-loop management process 3 is a connection relationship.

It is to be noted that an example in which the managed objects include the NSI, the NSSI-1, and the NSSI-2 is used for description in FIG. 4. Neither a quantity of NSSIs nor a quantity of NSIs is limited in this application.

Figure 5:
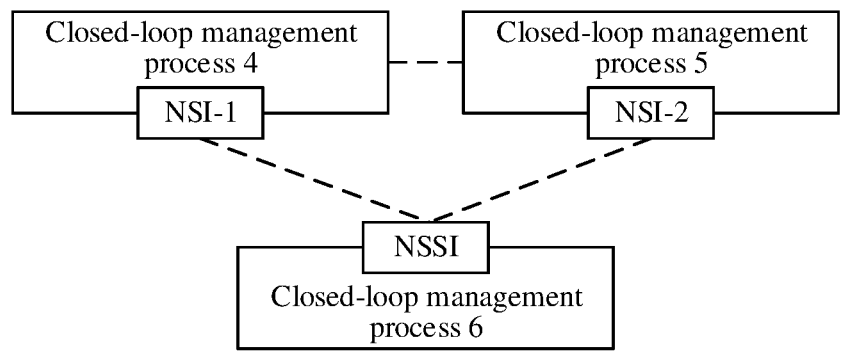
FIG. 5 is a schematic diagram of another managed object according to an embodiment of this application.

FIG. 5 is a schematic diagram of another managed object according to an embodiment of this application.

As shown in FIG. 5, managed objects include an NSI-1, an NSI-2, and an NSSI. The NSI-1 and the NSI-2 are in a resource sharing relationship. For example, the NSI-1 and the NSI-2 share a slice subnet in a same RAN domain, the NSI-1 and the NSI-2 are two different cross-domain network slices, and the NSSI is a slice subnet in the RAN domain. The NSI-1 corresponds to a closed-loop management process 4, the NSI-2 corresponds to a closed-loop management process 5, and the NSSI corresponds to a closed-loop management process 6.

With reference to FIG. 5, the NSI-1 is connected to the NSI-2, the NSI-1 includes the NSSI, and the NSI-2 includes the NSSI. In this case, an association relationship between the NSI-1 and the NSI-2 is a sharing relationship, an association relationship between the NSI-1 and the NSSI is an inclusion relationship, and an association relationship between the NSI-2 and the NSSI is an inclusion relationship. Based on the association relationships between the NSI-1, the NSI-2, and the NSSI, and a correspondence between the closed-loop management process 4 to the closed-loop management process 6 and the NSI-1, the NSI-2, and the NSSI, it may be learned that association relationships between the closed-loop management process 4 to the closed-loop management process 6 are as follows: An association relationship between the closed-loop management process 4 and the closed-loop management process 5 is a sharing relationship, an association relationship between the closed-loop management process 4 and the closed-loop management process 6 is an inclusion relationship, and an association relationship between the closed-loop management process 5 and the closed-loop management process 6 is an inclusion relationship.

Optionally, if managed objects corresponding to a plurality of closed-loop management processes share some or all resources, an association relationship between the plurality of closed-loop management processes is a sharing relationship.

For a case in which managed objects corresponding to a plurality of closed-loop management processes share some resources, refer to the foregoing description of FIG. 5.

A case in which managed objects corresponding to a plurality of closed-loop management processes share all resources is as follows: A closed-loop management process a is used to meet a throughput indicator requirement of the managed object a, and a closed-loop management process b is used to meet a latency indicator requirement of the managed object a. The closed-loop management process a and the closed-loop management process b correspond to different assurance goals of a same managed object (for example, the managed object a). In this case, the closed-loop management process a and the closed-loop management process b correspond to the same managed object, and all resources of the same managed object are the same. Therefore, an association relationship between the closed-loop management process a and the closed-loop management process b is a sharing relationship.

For example, the N pieces of management policy information may be for implementing the assurance goals of the N closed-loop management processes.

With reference to FIG. 4, it is assumed that the closed-loop management process 1 corresponds to management policy information 1, the closed-loop management process 2 corresponds to management policy information 2, and the closed-loop management process 3 corresponds to management policy information 3. In this case, the management policy information 1 to the management policy information 3 may be used together to implement an assurance goal of the closed-loop management process 1 to an assurance goal of the closed-loop management process 3, or the management policy information 1 to the management policy information 3 may respectively implement an assurance goal of the closed-loop management process 1 to an assurance goal of the closed-loop management process 3. For example, the management policy information 1 may implement the assurance goal of the closed-loop management process 1, the management policy information 2 may implement the assurance goal of the closed-loop management process 2, and the management policy information 3 may implement the assurance goal of the closed-loop management process 3.

Optionally, one piece of management policy information may include one or more management policies.

For example, the N pieces of management policy information may include first management policy information and at least one piece of second management policy information. The first management policy information may include one or more first management policies, and the second management policy information may include one or more second management policies.

In some embodiments, the assurance goals of the N closed-loop management processes may be determined by the network management consumer entity based on requirement information of the N managed objects.

Optionally, the assurance goal may include a service or network requirement. The network management consumer entity may determine the N pieces of management policy information based on the association relationship information and service or network requirements of the N closed-loop management processes. A name of the assurance goal is not limited in this application.

For example, requirement information of a managed object may be a subset of an attribute of a service level agreement (SLA) or an SLS, for example, indicator requirements of all or some attributes in a network slice service requirement (service profile) and/or a network slice subnet performance requirement (slice profile).

For example, the network slice service requirement may include information such as a latency, a downlink throughput of the network slice (dLThptPerSlice), and an uplink throughput of the network slice (uLThptPerSlice). The network slice subnet performance requirement may include information such as a latency of a network slice subnet, a downlink throughput of the network slice subnet (dLThptPerSliceSubnet), and an uplink throughput of the network slice subnet (uLThptPerSliceSubnet).

For example, the network management consumer entity may determine an end-to-end latency of a network slice-level closed-loop management process based on an end-to-end latency requirement in the network slice service requirement, determine a latency of a network slice subnet-level closed-loop management process in a RAN domain based on a RAN-domain latency requirement in the network slice subnet performance requirement, and determine a latency of a network slice subnet-level closed-loop management process in a CN domain based on a CN-domain latency requirement in the network slice subnet performance requirement.

With reference to FIG. 4, a latency is used as an example. The assurance goal of the closed-loop management process 1 may include that an end-to-end latency is less than a first threshold. The assurance goal of the closed-loop management process 2 may include that a latency in a RAN domain 1 is less than a second threshold. The assurance goal of the closed-loop management process 3 may include that a latency in a RAN domain 2 is less than a third threshold. The first threshold, the second threshold, and the third threshold may be the same or different.

In a possible design, the management policy information may include one or more pieces of first action indication information.

Optionally, the first action indication information may indicate the network management producer entity to set configuration information of the managed object corresponding to the closed-loop management process.

For example, the configuration information may include but is not limited to one or more of the following: radio resource configuration information, core network resource configuration information, and parameter configuration (such as a handover parameter) information.

For example, using a resource as an example, the first action indication information may indicate the network management producer entity to allocate a resource to the managed object corresponding to the closed-loop management process, indicate the network management producer entity to adjust (or modify) resource configuration information of the managed object corresponding to the closed-loop management process, indicate the network management producer entity to delete resource configuration information of the managed object corresponding to the closed-loop management process, indicate the network management producer entity to add resource configuration information of the managed object corresponding to the closed-loop management process, and/or indicate the network management producer entity to modify a configuration parameter.

Optionally, one piece of first action indication information may be referred to as one management policy.

For example, one piece of first action indication information in the first management policy information may be referred to as one first management policy. One piece of first action indication information in the second management policy information may be referred to as one second management policy.

It is to be noted that, in this embodiment of this application, for specific implementations of the N pieces of management policy information, refer to the foregoing and the following implementations of the management policy information. A main difference between the N pieces of management policy information lies in that the N pieces of management policy information respectively correspond to different closed-loop management processes and managed objects. For example, the management policy information 1 corresponds to the closed-loop management process 1 and a managed object 1, and the management policy information 2 corresponds to the closed-loop management process 2 and a managed object 2.

In some embodiments, the management policy information may include an identifier of the management policy information.

In a possible design, the management policy information may further include one or more pieces of condition information and/or one or more pieces of event information.

Optionally, the condition information may include a relationship between a network or a service of a managed object corresponding to a closed-loop management process and a network threshold or a service threshold.

For example, the network or the service of the managed object may include but is not limited to one or more of the following: a latency and a throughput.

For example, the network or service threshold may include but is not limited to one or more of the following: a latency threshold and a throughput threshold.

For example, the condition information may include: The latency of the managed object is greater than the latency threshold, and/or the throughput of the managed object is less than the throughput threshold.

Optionally, one piece of condition information may correspond to at least one piece of first action indication information.

Optionally, one piece of condition information and one piece of corresponding first action indication information may be referred to as one management policy.

For example, one piece of condition information and one piece of corresponding first action indication information in the first management policy information may be referred to as one first management policy. One piece of condition information and one piece of corresponding first action indication information in the second management policy information may be referred to as one second management policy.

In other words, when one piece of condition information is met, a network management producer may perform an operation indicated by one or more pieces of first action indication information.

Optionally, the event information may include one or more of the following: a notification event corresponding to the managed object corresponding to the closed-loop management process, and/or a notification event corresponding to a managed object other than the managed object corresponding to the closed-loop management process, a notification event generated by a network management producer entity, and a notification event generated by a network management producer entity other than the network management producer entity.

For example, the notification event corresponding to the managed object corresponding to the closed-loop management process may include a preconfigured periodic event and a condition trigger event; the notification event corresponding to the managed object other than the managed object corresponding to the closed-loop management process may include a preconfigured periodic event and a condition trigger event; the notification event generated by the network management producer entity may include a preconfigured periodic event and a condition trigger event; and the notification event generated by the network management producer entity other than the network management producer entity may include a preconfigured periodic event and a condition trigger event.

For example, the condition trigger event may include an event triggered by a condition (for example, a watchdog or a condition corresponding to another mechanism).

Optionally, one piece of event information may correspond to at least one piece of first action indication information.

Optionally, one piece of event information and one piece of corresponding first action indication information may be referred to as one management policy.

For example, one piece of event information and one piece of corresponding first action indication information in the first management policy information may be referred to as one first management policy. One piece of event information and one piece of corresponding first action indication information in the second management policy information may be referred to as one second management policy.

In other words, when one piece of event information is met, a network management producer may perform an operation indicated by one or more pieces of first action indication information.

Alternatively, optionally, one piece of event information and one piece of condition information may correspond to at least one piece of first action indication information.

Optionally, one piece of event information, one piece of condition information, and one piece of corresponding first action indication information may be referred to as one management policy.

For example, one piece of event information, one piece of condition information, and one piece of corresponding first action indication information in the first management policy information may be referred to as one first management policy. One piece of event information, one piece of condition information, and one piece of corresponding first action indication information in the second management policy information may be referred to as one second management policy.

In other words, when the event information and the condition information are met, a network management producer may perform an operation indicated by one or more pieces of first action indication information.

In a possible design, the management policy information may further include one or more pieces of first sub-action indication information.

For example, the management policy information may include one or more pieces of first action indication information and one or more pieces of first sub-action indication information. For another example, the management policy information may include one or more pieces of first action indication information, one or more pieces of condition information, and one or more pieces of first sub-action indication information. For another example, the management policy information may include one or more pieces of first action indication information, one or more pieces of event information, and one or more pieces of first sub-action indication information. For another example, the management policy information may include one or more pieces of first action indication information, one or more pieces of condition information, one or more pieces of event information, and one or more pieces of first sub-action indication information.

Optionally, the event information and/or the condition information may correspond to the first sub-action indication information.

In other words, when the event information and/or the condition information are/is met, a network management producer may perform an operation indicated by one or more pieces of first sub-action indication information.

Optionally, one piece of event information, one piece of condition information, and one piece of corresponding first sub-action indication information may be referred to as one management policy. Management policies are not listed one by one in this application.

For example, one piece of event information, one piece of condition information, and one piece of corresponding first sub-action indication information in the first management policy information may be referred to as one first management policy. One piece of event information, one piece of condition information, and one piece of corresponding first sub-action indication information in the second management policy information may be referred to as one second management policy.

In some embodiments, the first sub-action indication information may indicate the first network management producer entity to send first notification information and/or a first operation result to the second network management producer entity.

Optionally, an entity receiving a first message (for details, refer to the following S302) is the first network management producer entity, a closed-loop management process managed by the first network management producer entity is the first closed-loop management process, a closed-loop management process having an association relationship with the first closed-loop management process is the second closed-loop management process, and an entity configured to manage the second closed-loop management process is the second network management producer entity. There may be one or more second closed-loop management processes, and there may be one or more second network management producer entities.

For example, with reference to FIG. 2, if the network management producer entity 1 receives the first message, the network management producer entity 1 is the first network management producer entity, and the closed-loop management process 1 is the first closed-loop management process. For the network management producer entity 1, the network management producer entity 2 is the second network management producer entity, and the closed-loop management process 2 is the second closed-loop management process. If the network management producer entity 2 receives the first message, the network management producer entity 2 is the first network management producer entity, and the closed-loop management process 2 is the first closed-loop management process. For the network management producer entity 2, the network management producer entity 1 is the second network management producer entity, and the closed-loop management process 1 is the second closed-loop management process. Certainly, both the network management producer entity 1 and the network management producer entity 2 may receive the first message. The first message received by the network management producer entity 1 includes management policy information 1 corresponding to the closed-loop management process 1, and the first message received by the network management producer entity 2 includes management policy information 2 corresponding to the closed-loop management process 2.

For example, the first notification information may include an assurance goal that is of the second closed-loop management process and that the network management consumer entity expects the second network management producer entity to use.

For example, the first operation result may be obtained by the first network management producer entity based on the first action indication information, or the first operation result may be obtained by the first network management producer entity based on the first action indication information and one or more of the condition information and the event information.

That is, the management policy information may include a policy for indicating the first network management producer entity to collaborate with the second network management producer entity, and the network management producer entities may collaborate with each other based on the first sub-action indication information, to coordinate and manage the closed-loop management process.

In some embodiments, the first operation result may include one or more of the following: a first performance result, an identifier of management policy information corresponding to the first performance result, condition information corresponding to the first performance result, event information corresponding to the first performance result, and first action indication information corresponding to the first performance result.

Optionally, a managed object corresponding to the first closed-loop management process is the first managed object, and the first performance result may include a result of performance of the first managed object.

For example, the first performance result includes: A throughput of the first managed object is greater than 100 megabits per second (million bits per second, Mbps), or the result of the performance of the first managed object meets or does not meet the assurance goal of the first closed-loop management process.

That is, the first operation result may include one or more of the following: the first performance result, the identifier of the management policy information used to obtain the first performance result, the condition information, the event information, and the first action indication information. In this way, the second network management producer entity can determine, based on the first operation result, whether to adjust a policy of the second network management producer entity, to implement the assurance goal of the first closed-loop management process and the assurance goal of the at least one second closed-loop management process.

The following describes, with reference to FIG. 4 and Table 2 to Table 4, management policy information corresponding to a closed-loop management process.

Table 2 uses an example in which closed-loop management processes in FIG. 4 include a closed-loop management process 1 and a closed-loop management process 2, an NSI is a cross-domain network slice, an NSSI-1 is a slice subnet in a RAN domain, and a latency is used. First action indication information corresponding to the closed-loop management process 1 indicates a network management producer 1 to add a network slice resource configuration, so that an end-to-end latency is less than 10 ms. First action indication information corresponding to the closed-loop management process 2 indicates a network management producer 2 to add a network slice resource configuration, so that a latency in the RAN domain is reduced to be less than 5 ms. Condition information corresponds to the first action indication information. When the condition information is met, the network management producer performs an operation in the first action indication information.

First sub-action indication information corresponding to the closed-loop management process 1 may indicate the network management producer 1 to send first notification information to a network management producer 2, and may further indicate to send a first operation result (not shown in Table 2). First sub-action indication information corresponding to the closed-loop management process 2 may indicate the network management producer 2 to apply an assurance goal in the first notification information when event information is met, and may further indicate the network management producer 2 to report, to the network management consumer entity and/or the network management producer 1 (not shown in Table 2), an event of applying the assurance goal in the first notification information. When the event information corresponding to the closed-loop management process 2 is met, the network management producer 2 performs an operation indicated by the first sub-action indication information. Optionally, the first sub-action indication information corresponding to the closed-loop management process 1 may be corresponding to or not corresponding to the condition information corresponding to the closed-loop management process 1.

It is to be noted that Table 2 is merely an example. For example, the management policy information may include more or less content than that in Table 2. Details are not listed one by one in this application.

process 2 and the closed-loop management process 3 are in a connection relationship (serial connection), any segment of throughput bottleneck affects cross-domain throughput performance, and the closed-loop management process 2

TABLE 2

| Closed-loop management process | Assurance goal | Association relationship information | Management policy information | | | |
|---|---|---|---|---|---|---|
| | | | Identifier | Condition information and/or event information | First action indication information | First sub-action indication information |
| Closed-loop management process 1 | An end-to-end latency is less than 10 milliseconds (millisecond, ms) | An association relationship between the closed-loop management process 1 and the closed-loop management process 2 is an inclusion relationship | Management policy information 1 | Condition information: the end-to-end latency is greater than 10 ms | Add a network slice resource configuration | Indicate to send first notification information, where the first notification information may include: a RAN-domain latency corresponding to the closed-loop management process 2 is less than 3 ms |
| Closed-loop management process 2 | A latency in a RAN domain is less than 5 ms | An association relationship between the closed-loop management process 1 and the closed-loop management process 2 is an inclusion relationship | Management policy information 2 | (1) Condition information: the latency in the RAN domain is greater than 5 ms; (2) event information: first notification information from a network management producer entity 1 is received | Add a slice subnet resource in the RAN domain | If the event information is met, apply an assurance goal in the first notification information, where an event of applying the assurance goal in the first notification information may be further reported to a network management consumer entity |

Table 3 uses an example in which closed-loop management processes in FIG. 4 include a closed-loop management process 2 and a closed-loop management process 3, an NSSI-1 is a slice subnet in a RAN domain, an NSSI-2 is a slice subnet in a CN domain, and a throughput is used. First action indication information corresponding to the closed-loop management process 2 indicates a network management producer 2 to add a network slice resource configuration, so that a network slice subnet throughput in the RAN domain is greater than 100 Mbps. First action indication information corresponding to the closed-loop management process 3 indicates a network management producer 3 to add a network slice resource configuration, so that a network slice throughput in the CN domain is greater than 100 Mbps. Condition information corresponds to the first action indication information. When the condition information is met, the network management producer performs an operation in the first action indication information.

First sub-action indication information corresponding to the closed-loop management process 2 may indicate the network management producer 2 to send first notification information to the network management producer 3, and may further indicate to send a first operation result (not shown in Table 3). Because the closed-loop management process 2 and the closed-loop management process 3 need to be synchronously adjusted or wait for a collaboration message of collaborators (for example, the network management producer 2 and the network management producer 3 are collaborators). First sub-action indication information corresponding to the closed-loop management process 3 may indicate the network management producer 3 to apply an assurance goal in the first notification information when event information is met, and may further indicate the network management producer 3 to report, to the network management consumer entity and/or the network management producer 2 (not shown in Table 3), an event of applying the assurance goal in the first notification information. When the event information corresponding to the closed-loop management process 3 is met, the network management producer 3 performs an operation indicated by the first sub-action indication information. The first sub-action indication information corresponding to the closed-loop management process 2 may correspond to the condition information corresponding to the closed-loop management process 2.

It is to be noted that Table 3 is merely an example. For example, the management policy information may include more or less content than that in Table 3. Details are not listed one by one in this application.

TABLE 3

| Closed-loop management process | Assurance goal | Association relationship information | Management policy information | | | | |
|---|---|---|---|---|---|---|---|
| | | | Identifier | Condition information and/or event information | First action indication information | First sub-action indication information |
| Closed-loop management process 2 | A network slice subnet throughput in a RAN domain is greater than 100 Mbps | An association relationship between the closed-loop management process 2 and the closed-loop management process 3 is a connection relationship | Management policy information 3 | Condition information: the network slice subnet throughput in the RAN domain is less than 100 Mbps | Add a slice subnet resource configuration in the RAN domain | Indicate to send first notification information, where the first notification information may include: a CN-domain network slice throughput corresponding to the closed-loop management process 3 is greater than 110 Mbps |
| Closed-loop management process 3 | A network slice through put in a CN domain is greater than 100 Mbps | An association relationship between the closed-loop management process 2 and the closed-loop management process 3 is a connection relationship | Management policy information 4 | (1) Condition information: a network slice subnet throughput in the CN domain is less than 100 Mbps; (2) event information: first notification information from a network management producer entity 2 is received | Add a slice subnet resource configuration in the CN domain | If the event information is met, apply an assurance goal in the first notification information, where an event of applying the assurance goal in the first notification information may be further reported to a network management consumer entity |

Table 4 uses an example in which closed-loop management processes in FIG. 4 include a closed-loop management process 1 to a closed-loop management process 3, an NSI is a cross-domain network slice, an NSSI-1 is a slice subnet in a RAN domain, an NSSI-2 is a slice subnet in a CN domain, and a latency or a throughput is used. First action indication information corresponding to each of the closed-loop management process 1 to the closed-loop management process 3 separately indicates to add a network slice resource configuration, to achieve a corresponding assurance goal. Condition information may correspond to the first action indication information. When the condition information is met, a network management producer performs an operation in the corresponding first action indication information.

First sub-action indication information 1 corresponding to the closed-loop management process 1 may indicate a network management producer 1 to send first notification information 1 to a network management producer 2 or a network management producer 3, and may further indicate to send a first operation result (not shown in Table 4). Correspondingly, if first sub-action indication information 1 corresponding to the network management producer 2 or the network management producer 3 indicates that the network management producer 2 or the network management producer 3 receives the first notification information 1 (event information 1 is met), an assurance goal in the first notification information 1 is applied based on the first sub-action indication information, so that a slice subnet resource configuration in a corresponding domain can be added, to achieve an assurance goal that a latency is less than 5 ms.

TABLE 4

| Closed-loop management process | Assurance goal | Association relationship information | Management policy information | | | | |
|---|---|---|---|---|---|---|---|
| | | | Identifier | Condition information and/or event information | First action indication information | First sub-action indication information |
| Closed-loop management process 1 | An end-to-end latency is less than 10 ms | The closed-loop management process 1 and the closed-loop | Management policy information 5 | (1) Condition information: the end-to-end latency is | Add a network slice resource configuration | 1. Indicate to send first notification information 1 |

TABLE 4-continued

| | | | | Management policy information | | |
|---|---|---|---|---|---|---|
| Closed-loop management process | Assurance goal | Association relationship information | Identifier | Condition information and/or event information | First action indication information | First sub-action indication information |
| | | management process 2 have an inclusion relationship; the closed-loop management process 1 and the closed-loop management process 3 have an inclusion relationship; and the closed-loop management process 2 and the closed-loop management process 3 have a connection relationship | | greater than 10 ms; or a network slice subnet throughput in a RAN domain is less than 100 Mbps; or a throughput in a CN domain is less than 100 Mbps; (2) event information: a first operation result and/or first modification request information from a network management producer entity 2 or 3 are/is received | | to the network management producer entity 2, where the first notification information 1 may include: a RAN-domain latency corresponding to the closed-loop management process 2 is less than 5 ms; 2. indicate to send first notification information 2 to the network management producer entity 3, where the first notification information 2 may include: a CN-domain latency corresponding to the closed-loop management process 3 is less than 5 ms; 3. if the event information is met, send first notification information 3 to the network management producer entity 2 or 3, where the first notification information 3 may include: a throughput corresponding to the closed-loop management process 2 or 3 is greater than 90 Mbps |
| Closed-loop management process 2 | A throughput in a RAN domain is greater than 100 Mbps | Same as the above | Management policy information 6 | (1) Condition information: a network slice subnet throughput in a CN domain is less than 100 Mbps; (2) event information 1: first notification information 1 from a network management producer entity 1 is received, where the first notification | Add a slice subnet resource configuration in the RAN domain | 1. If the event information 1 is met, apply an assurance goal in the first notification information 1, where an event of applying the assurance goal in the first notification information 1 may be further reported to a network |

TABLE 4-continued

| Closed-loop management process | Assurance goal | Association relationship information | Identifier | Condition information and/or event information | First action indication information | First sub-action indication information |
|---|---|---|---|---|---|---|
| | | | | information 1 may include: a RAN-domain latency corresponding to the closed-loop management process 2 is less than 5 ms; (3) event information 2: first notification information 3 from the network management producer entity 1 is received, where the first notification information 3 may include: a throughput corresponding to the closed-loop management process 2 is greater than 90 Mbps; (4) event information 3: first notification information 4 from a network management producer entity 3 is received, where the first notification information 4 may include: a RAN-domain latency corresponding to the closed-loop management process 2 is less than 5 ms | | management consumer entity; 2. indicate to send a first operation result and/or first modification request information to the network management producer entity 1, where for example, the first modification request information is used to request to modify an assurance goal; 3. if the event information 2 is met, apply an assurance goal in the first notification information 3, where an event of applying the assurance goal in the first notification information 3 may be further reported to the network management consumer entity; 4. if the event information 3 is met, apply an assurance goal in the first notification information 4, for example, add a slice subnet resource configuration in the RAN domain, where an event of applying the assurance goal in the first notification information 4 may be further reported to the network management consumer entity; 5. indicate to send first |

(Management policy information spans: Identifier, Condition information and/or event information, First action indication information, First sub-action indication information)

TABLE 4-continued

| Closed-loop management process | Assurance goal | Association relationship information | Management policy information ||||
|---|---|---|---|---|---|---|
| | | | Identifier | Condition information and/or event information | First action indication information | First sub-action indication information |
| | | | | | | notification information 5 to the network management producer entity 3, where the first notification information 5 may include: a CN-domain latency corresponding to the closed-loop management process 3 is less than 5 ms |
| Closed-loop management process 3 | A throughput in a CN domain is greater than 100 Mbps | Same as the above | Management policy information 7 | (1) Condition information: a throughput in a CN domain is less than 100 Mbps; (2) event information 1: first notification information 2 from a network management producer entity 1 is received, where the first notification information 2 may include: a CN-domain latency corresponding to the closed-loop management process 3 is less than 5 ms; (3) event information 2: first notification information 3 from the network management producer entity 1 is received, where the first notification information 3 may include: a CN-domain throughput corresponding to the closed-loop management process 3 is greater than 90 Mbps; (4) event information 3: first notification information 5 from a network management | Add a slice subnet resource configuration in the CN domain | 1. If the event information 1 is met, apply an assurance goal in the first notification information 2, where an event of applying the assurance goal in the first notification information 2 may be further reported to a network management consumer entity; 2. indicate to send a first operation result and/or first modification request information to the network management producer entity 1, where for example, the first modification request information is used to request to modify an assurance goal; 3. if the event information 2 is met, apply an assurance goal in the first notification information 3, where an event of applying the assurance goal in the first notification |

TABLE 4-continued

| Closed-loop management process | Assurance goal | Association relationship information | Identifier | Condition information and/or event information | First action indication information | First sub-action indication information |
|---|---|---|---|---|---|---|
| | | | | producer entity 2 is received, where the first notification information 5 may include: a CN-domain latency corresponding to the closed-loop management process 3 is less than 5 ms | | information 3 may be further reported to the network management consumer entity; 4. if the event information 3 is met, apply an assurance goal in the first notification information 5, for example, add a slice subnet resource configuration in the CN domain, where an event of applying the assurance goal in the first notification information 5 may be further reported to the network management consumer entity; 5. indicate to send first notification information 4 to the network management producer entity 2, where the first notification information 4 may include: a RAN-domain latency corresponding to the closed-loop management process 2 is less than 5 ms |

First sub-action indication information 2 corresponding to a closed-loop management process 2 or a network management producer 3 may indicate a network management producer 2 or 3 to send a first operation result and/or first modification request information to a network management producer 1. Optionally, the first modification request information may be used to request to modify management policy information and/or an assurance goal of the closed-loop management process. Correspondingly, first sub-action indication information 3 corresponding to the network management producer 1 may indicate that the network management producer 1 receives the first operation result and/or the first modification request information (event information is met). In this case, first notification information 3 is sent to the network management producer entity 2 or 3. For example, the first notification information 3 may include that a throughput is greater than 90 Mbps. Correspondingly, first sub-action indication information 3 corresponding to the closed-loop management process 2 or the network management producer 3 may indicate that the first notification information 3 from the network management producer entity 1 is received (event information 2 is met). In this case, an assurance goal in the first notification information 3 is applied, so that a slice subnet resource configuration in a corresponding domain can be added, to achieve an assurance goal that a throughput is greater than 90 Mbps.

First sub-action indication information 5 of the closed-loop management process 2 may indicate the network management producer 2 to send first notification information 5 to the network management producer 3. For example, the first notification information 5 may include that a CN-domain latency corresponding to the closed-loop management process 3 is less than 5 ms, and may further indicate to send a first operation result (not shown in Table 4). Correspondingly, first sub-action indication information 4 corresponding to the network management producer 3 may indicate that the network management producer 3 receives the first notification information 5 (event information 3 is met). In this case, an assurance goal in the first notification information 5 is applied, so that a slice subnet resource configuration in a corresponding domain can be added, to achieve an assurance goal that a latency is less than 5 ms.

First sub-action indication information 5 of the closed-loop management process 3 may indicate the network management producer 3 to send first notification information 4 to the network management producer 2. For example, the first notification information 4 may include that a RAN-domain latency corresponding to the closed-loop management process 2 is less than 5 ms, and may further indicate to send a first operation result (not shown in Table 4). Correspondingly, first sub-action indication information 4 corresponding to the network management producer 2 may indicate that the network management producer 2 receives the first notification information 4 (event information 3 is met). In this case, an assurance goal in the first notification information 4 is applied, so that a slice subnet resource configuration in a corresponding domain can be added, to achieve an assurance goal that a latency is less than 5 ms.

Optionally, if a network management producer (for example, the network management producer 1, the network management producer 2, or the network management producer 3) receives a plurality of pieces of first notification information within a preset time window, and the plurality of pieces of first notification information have same content, the operation in the first sub-action indication information may be performed only once.

Optionally, if the plurality of pieces of first notification information of the network management producer conflict, first sub-action indication information or first action indication information corresponding to the plurality of pieces of first notification information may be performed based on priorities of a plurality of closed-loop management processes.

For example, a priority of the closed-loop management process 1 is higher than that of the closed-loop management process 2, the priority of the closed-loop management process 2 is higher than that of the closed-loop management process 3, and the network management producer 1 receives first notification information from the network management producer 2 and first notification information from the network management producer 3. If the two pieces of first notification information conflict, an action triggered by the first notification information of the network management producer 2 is first performed, and then an action triggered by the first notification information of the network management producer 3 is performed.

It is to be noted that Table 4 is merely an example. For example, the management policy information may include more or less content than that in Table 4. Details are not listed one by one in this application.

The following specifically describes, with reference to FIG. 5 and Table 5, management policy information corresponding to a closed-loop management process.

TABLE 5

| Closed-loop management process | Assurance goal | Association relationship information | Management policy information | | | |
|---|---|---|---|---|---|---|
| | | | Identifier | Condition information and/or event information | First action indication information | First sub-action indication information |
| Closed-loop management process 4 | A network slice throughput in a cross domain 1 is greater than 100 Mbps | An association relationship between the closed-loop management process 4 and the closed-loop management process 5 is a sharing relationship. | Management policy information 8 | Condition information: the network slice throughput in the cross domain 1 is less than 100 Mbps | Add a network slice resource configuration in the cross domain 1 | Indicate to send first notification information, where the first notification information may include: a network slice throughput corresponding to the closed-loop management process 5 is greater than 120 Mbps |
| Closed-loop management process 5 | A network slice throughput in a cross domain 2 is greater than 120 Mbps | An association relationship between the closed-loop management process 4 and the closed-loop management process 5 is a sharing relationship. | Management policy information 9 | Condition information: the network slice throughput in the cross domain 2 is less than 120 Mbps; event information: first notification information from a network management producer entity 4 is received | Add a network slice resource configuration in the cross domain 2 | If the event information is met, apply an assurance goal in the first notification information, where an event of applying the assurance goal in the first notification information may be further reported to a network management consumer entity |

Table 5 uses an example in which closed-loop management processes in FIG. 5 include a closed-loop management process 4 and a closed-loop management process 5, an NSI-1 and an NSI-2 are two different cross-domain network slices, and a throughput is used. First action indication information corresponding to the closed-loop management process 4 indicates a network management producer 4 to add a network slice resource configuration, so that a network slice throughput in a cross domain 1 is less than 100 Mbps. First action indication information corresponding to the closed-loop management process 5 indicates a network management producer 5 to add a network slice resource configuration, so that a network slice throughput in a cross domain 2 is less than 120 Mbps. Condition information corresponds to the first action indication information. When the condition information is met, the network management producer performs an operation in the first action indication information.

First sub-action indication information corresponding to the closed-loop management process 4 may indicate the network management producer 4 to send first notification information to a network management producer 5, and may further indicate to send a first operation result (not shown in Table 5). First sub-action indication information corresponding to the closed-loop management process 5 may indicate the network management producer 5 to apply an assurance goal in the first notification information when event information is met, and may further indicate the network management producer 5 to report, to the network management consumer entity and/or the network management producer 4 (not shown in Table 5), an event of applying the assurance goal in the first notification information. When the event information corresponding to the closed-loop management process 5 is met, the network management producer 5 performs an operation indicated by the first sub-action indication information. The first sub-action indication information corresponding to the closed-loop management process 4 may correspond to the condition information corresponding to the closed-loop management process 4.

It is to be noted that Table 5 is merely an example. For example, the management policy information may include more or less content than that in Table 5. Details are not listed one by one in this application.

S302 (not shown in FIG. 3): The network management consumer entity sends the first message to at least two network management producer entities. Correspondingly, the network management producer entity receives the first message from the network management consumer entity.

It is to be noted that, when the network management consumer entity sends the first message to the at least two network management producer entities, the first message may be sent in a plurality of steps.

For example, the at least two network management producer entities include a first network management producer entity and a second network management producer entity. S302 may include: S302-1: The network management consumer entity sends the first message to the first network management producer entity. S302-2: The network management consumer entity sends the first message to the second network management producer entity. Correspondingly, the first network management producer entity receives the first message from the network management consumer entity, and the second network management producer entity receives the first message from the network management consumer entity.

For example, the first message may include the management policy information. For example, the first message received by the first network management producer entity includes the first management policy information, and the first message received by the second network management producer entity includes the second management policy information. A main difference between the first management policy information and the second management policy information lies in that the first management policy information corresponds to the first closed-loop management process, and the second management policy information corresponds to the second closed-loop management process. For a specific implementation, refer to the implementation of the management policy information in S301. Details are not described herein again.

For example, if the at least two network management producer entities include a network management producer entity 1 and a network management producer entity 2, the network management producer entity 1 is configured to manage a closed-loop management process 1, and the network management producer entity 2 is configured to manage a closed-loop management process 2, a first message 1 sent by the network management consumer entity to the network management producer entity 1 may include management policy information 1, and a first message 2 sent by the network management consumer entity to the network management producer entity 2 may include management policy information 2. In this way, the network management producer entity 1 may implement an assurance goal of the closed-loop management process 1 based on the management policy information 1, and the network management producer entity 2 may implement an assurance goal of the closed-loop management process 2 based on the management policy information 2.

In this way, a plurality of network management producer entities may implement, based on respective management policy information, assurance goals corresponding to respective closed-loop management processes.

Optionally, the network management producer entity may be configured to manage the closed-loop management process. One network management producer entity manages one or more closed-loop management processes. In this embodiment of this application, an example in which one network management producer entity manages one closed-loop management process is used for description.

For example, an entity receiving the first message is the first network management producer entity, the first message may include the first management policy information, the first management policy information is management policy information corresponding to the first closed-loop management process, there is an association relationship between the first closed-loop management process and at least one second closed-loop management process, and management policy information corresponding to the second closed-loop management process is the second management policy information.

For example, the first management policy information and at least one piece of second management policy information are for implementing the assurance goal of the first closed-loop management process and the assurance goal of the at least one second closed-loop management process. For a specific implementation, refer to the specific example in which the N pieces of management policy information in S301 may be for implementing the assurance goals of the N closed-loop management processes. A sum of a quantity of pieces of first management policy information and a quantity of pieces of the at least one piece of second management policy information may be N.

In a possible design, an entity receiving the first message is the first network management producer entity, a closed-loop management process managed by the first network management producer entity is the first closed-loop management process, a managed object corresponding to the first closed-loop management process is the first managed object, a closed-loop management process having an association relationship with the first closed-loop management process is the second closed-loop management process, and an entity configured to manage the second closed-loop management process is the second network management producer entity. The first message may further include one or more of the following: an identifier of the second network management producer entity, an identifier of the second closed-loop management process, and an assurance goal of the first closed-loop management process.

Optionally, the first message received by the second network management producer entity may further include one or more of the following: an identifier of the first network management producer entity, an identifier of the first closed-loop management process, and an assurance goal of the second closed-loop management process.

For example, if the at least two network management producer entities include a network management producer entity 1 and a network management producer entity 2, the network management producer entity 1 is configured to manage a closed-loop management process 1, and the network management producer entity 2 is configured to manage a closed-loop management process 2, a first message 1 sent by the network management consumer entity to the network management producer entity 1 may include management policy information 1, an identifier of the network management producer entity 2, an identifier of the closed-loop management process 2, and an assurance goal of the closed-loop management process 1, and a first message 2 sent by the network management consumer entity to the network management producer entity 2 may include management policy information 2, an identifier of the network management producer entity 1, an identifier of the closed-loop management process 1, and an assurance goal of the closed-loop management process 2.

In this way, the network management producer entity 1 and the network management producer entity 2 each can not only implement an assurance goal of a closed-loop management processes based on management policy information, but also can obtain, based on the received first message, a network management producer entity associated with the network management producer entity 1 or the network management producer entity 2, and a closed-loop management process associated with the closed-loop management process managed by the network management producer entity 1 or the network management producer entity 2, to negotiate assurance goals of closed-loop management processes having an association relationship.

S303: The first network management producer entity performs the one or more first management policies in the first management policy information.

For a specific implementation of the first management policy information, refer to the implementation of the management policy information in S301. Details are not described herein again.

For example, the first network management producer entity performs the one or more first management policies in the first management policy information. The first management policy information is determined based on the association relationship information and the assurance goals of the N closed-loop management processes. An assurance goal of a closed-loop management process and an assurance goal of a closed-loop management process that has an association relationship with the closed-loop management process are considered. In this way, an SLS goal of a managed object (for example, a network slice and/or a network slice subnet) can be implemented.

In a possible design, S303 may include: The first network management producer entity sets, based on the first action indication information, configuration information of the first managed object corresponding to the first closed-loop management process.

For example, with reference to Table 2, it is assumed that the network management producer entity 1 is the first network management producer entity. The network management producer entity 1 adds a network slice resource configuration based on the first action indication information corresponding to the closed-loop management process 1, so that a RAN-domain latency is less than 10 ms, thereby ensuring the assurance goal corresponding to the closed-loop management process 1.

In a possible design, S303 may include: When the condition information and/or the event information are/is met, the first network management producer entity sets, based on the first action indication information, configuration information of the first managed object corresponding to the first closed-loop management process.

For example, with reference to Table 2, it is assumed that the network management producer entity 1 is the first network management producer entity. If an end-to-end latency is greater than 10 ms, the first network management producer entity adds a network slice resource configuration based on the first action indication information, so that the end-to-end latency is less than 10 ms, thereby ensuring the assurance goal corresponding to the closed-loop management process 1.

For example, with reference to Table 2, it is assumed that the network management producer entity 1 is the first network management producer entity. If an end-to-end latency is greater than 10 ms, a condition trigger event is triggered, where the condition trigger event indicates the network management producer entity 1 to send the first notification information to the network management producer entity 2.

In a possible design, S303 may include: The first network management producer entity sends a first collaboration message to the second network management producer entity based on the identifier of the second network management producer entity and the first sub-action indication information.

Correspondingly, the second network management producer entity receives the first collaboration message from the first network management producer entity.

Optionally, the first collaboration message may include the first notification information and/or the first operation result. The first notification information may include an assurance goal that is of the second closed-loop management process and that the network management consumer entity expects the second network management producer entity to use. The first operation result may be obtained by the first network management producer entity based on the first action indication information, or the first operation result may be obtained by the first network management producer entity based on the first action indication information and one or more of the condition information and the event information. For specific implementations of the first notification information and the first operation result, refer to S301. Details are not described herein again.

For example, with reference to Table 2, it is assumed that the first network management producer entity is the network management producer entity 1. The first network management producer entity sends a first collaboration message to the network management producer entity 2 based on the identifier of the network management producer entity 2 and the first sub-action indication information. The first collaboration message includes first notification information, and the first notification information may include that a RAN-domain latency corresponding to the closed-loop management process 2 is less than 3 ms.

In this way, the first network management producer entity may implement a collaborative operation with the second network management producer entity, to meet an assurance goal corresponding to a closed-loop management process.

In a possible design, S303 may include: When the condition information and/or the event information are/is met, the first network management producer entity sends a first collaboration message to the second network management producer entity based on the identifier of the second network management producer entity and the first sub-action indication information.

For example, with reference to Table 2, it is assumed that the first network management producer entity is the network management producer entity 1. If an end-to-end latency is greater than 10 ms, the first network management producer entity sends a first collaboration message to the network management producer entity 2 based on the first sub-action indication information. The first collaboration message includes first notification information, and the first notification information may include that a RAN-domain latency corresponding to the closed-loop management process 2 is less than 3 ms.

For example, with reference to Table 4, it is assumed that the first network management producer entity is the network management producer entity 1. If first modification request information from the network management producer entity 2 is received, the first network management producer entity sends a first collaboration message to the network management producer entity 2 based on the identifier of the network management producer entity 2 and the first sub-action indication information 3. The first collaboration message includes first notification information 3, and the first notification information 3 may include that a throughput corresponding to the closed-loop management process 2 is greater than 90 Mbps.

For example, with reference to Table 2, it is assumed that the first network management producer entity is the network management producer entity 1. If an end-to-end latency is greater than 10 ms and first modification request information (not shown in Table 2) from the network management producer entity 2 is received, the first network management producer entity sends a first collaboration message to the network management producer entity 2. The first collaboration message includes first notification information, and the first notification information may include that a RAN-domain latency corresponding to the closed-loop management process 2 is less than 3 ms.

In this way, when an attribute corresponding to the first closed-loop management process does not meet the assurance goal, and/or when the first modification request information from the second network management producer entity is received, a collaborative operation may be performed with the second network management producer entity, so that the attribute corresponding to the closed-loop management process meets the assurance goal.

In a possible design, the network management method provided in this embodiment of this application may further include S305: The first network management producer entity sends a first collaboration message to the second network management producer entity. Correspondingly, the second network management producer entity receives the first collaboration message from the first network management producer entity.

Optionally, the first collaboration message includes first notification information and/or a first operation result.

That is, the first network management producer entity may directly send the first collaboration message to the second network management producer entity, regardless of whether the management policy information includes the first sub-action indication information.

In a possible design, the network management method provided in this embodiment of this application may further include S306: The second network management producer entity sets, based on an assurance goal in the first notification information, configuration information of the second managed object corresponding to the second closed-loop management process.

Optionally, the first notification information is received from the first network management producer entity.

For example, with reference to Table 2, an assurance goal corresponding to the closed-loop management process 2 is that a RAN-domain latency is less than 5 ms. If the network management producer entity 2 receives first notification information, and the first notification information includes that a RAN-domain latency corresponding to the closed-loop management process 2 is less than 3 ms, the network management producer entity 2 applies the assurance goal that the RAN-domain latency is less than 3 ms, and adds a RAN-domain slice subnet resource, so that the RAN-domain latency is less than 3 ms.

That is, the second network management producer entity and the first network management producer entity may collaborate to implement the assurance goal of the first managed object and/or the assurance goal of the second managed object.

It is to be noted that a sequence of S306 and S304 is not limited in this embodiment of this application. For example, S306 may be performed after S304.

S304: The second network management producer entity performs the one or more second management policies in the second management policy information.

For a specific implementation of the second management policy information, refer to the implementation of the management policy information in S301. Details are not described herein again.

It is to be noted that, before S303 and S304, the first network management producer entity and the second network management producer entity may first negotiate, for example, negotiate one or more second management policies in the management policy information to be performed (for example, the management policy information includes a plurality of management policies), or negotiate condition information in the management policy information to be performed (for example, the management policy information includes a plurality of pieces of condition information).

For example, the second network management producer entity performs the one or more second management policies in the second management policy information. The second management policy information is determined based on the association relationship information and the assurance goals of the N closed-loop management processes. An assurance goal of a closed-loop management process (for example, the second closed-loop management process) and an assurance goal of a closed-loop management process (for example, one or more first closed-loop management processes) having an association relationship with the closed-loop management process are considered. In this way, an SLS goal of a managed object (for example, a network slice and/or a network slice subnet) can be implemented.

In a possible design, S304 may include: The second network management producer entity sets, based on the first action indication information, configuration information of the second managed object corresponding to the second closed-loop management process.

For example, with reference to Table 2, it is assumed that the network management producer entity 2 is the second network management producer entity. The network management producer entity 2 adds a network slice resource configuration based on the first action indication information corresponding to the closed-loop management process 2, so that a RAN-domain latency is less than 5 ms, thereby ensuring the assurance goal corresponding to the closed-loop management process 2.

In a possible design, S304 may include: When the condition information and/or the event information are/is met, the second network management producer entity sets, based on the first action indication information, configuration information of the second managed object corresponding to the second closed-loop management process.

For example, with reference to Table 2, it is assumed that the network management producer entity 2 is the second network management producer entity. If a RAN-domain latency is greater than 5 ms, the network management producer entity 2 adds a network slice resource configuration based on the first action indication information, so that an end-to-end latency is less than 5 ms, thereby ensuring the assurance goal corresponding to the closed-loop management process 2.

For example, with reference to Table 2, it is assumed that the network management producer entity 2 is the second network management producer entity. If first notification information of the network management producer entity 1 is received, the network management producer entity 2 applies an assurance goal in the first notification information, and adds a network slice resource configuration, so that an end-to-end latency is less than 5 ms, thereby ensuring the assurance goal corresponding to the closed-loop management process 2. Optionally, the network management producer entity 2 may further report, to the network management consumer entity, an event of applying the assurance goal in the first notification information.

For example, with reference to Table 2, it is assumed that the network management producer entity 2 is the second network management producer entity. If a RAN-domain latency is greater than 5 ms, a condition trigger event is triggered. The condition trigger event indicates the network management producer entity 2 to add a network slice resource configuration.

In a possible design, S304 may include: The second network management producer entity sends a second collaboration message to the first network management producer entity based on the identifier of the first network management producer entity and the first sub-action indication information. A specific implementation is similar to that in S303 in which the first network management producer entity sends the first collaboration message to the second network management producer entity based on the identifier of the second network management producer entity and the first sub-action indication information. Details are not described herein again.

Optionally, the second collaboration message may include second notification information and/or a second operation result.

Optionally, the second notification information may include an assurance goal that is of the first closed-loop management process and that the network management consumer entity expects the first network management producer entity to use.

Optionally, the second operation result may be obtained by the second network management producer entity based on the first action indication information, or the second operation result may be obtained by the second network management producer entity based on the first action indication information and one or more of the condition information and the event information.

In this way, the second network management producer entity may implement a collaborative operation with the first network management producer entity, to meet an assurance goal corresponding to a closed-loop management process (for example, the first closed-loop management process and/or the second closed-loop management process).

In a possible design, S304 may include: When the condition information and/or the event information are/is met, the second network management producer entity sends a second collaboration message to the first network management producer entity based on the identifier of the first network management producer entity and the first sub-action indication information. A specific implementation is similar to that in S303 in which when the condition information and/or the event information are/is met, the first network management producer entity sends the first collaboration message to the second network management producer entity based on the identifier of the second network management producer entity and the first sub-action indication information. Details are not described herein again.

In this way, when an attribute corresponding to the second closed-loop management process does not meet the assurance goal, and/or when the first modification request information from the first network management producer entity is received, a collaborative operation may be performed with the first network management producer entity, so that the attribute corresponding to the closed-loop management process (for example, the first closed-loop management process and/or the second closed-loop management process) meets the assurance goal.

In some embodiments, in a process of performing the management policy, the network management producer entity (for example, the first network management producer entity or the second network management producer entity) may invoke a function of another management service, for example, invoke a function of performance management (PM) or a function of fault management (FM) to perform performance or fault monitoring to determine whether a condition in the associated policy is met, or invoke a function of an orchestration management service (orchestration MnS) to reconfigure a resource or a parameter.

In a possible design, the network management method provided in this embodiment of this application may further include S307: The second network management producer entity sends a second collaboration message to the first network management producer entity. Correspondingly, the first network management producer entity receives the second collaboration message from the second network management producer entity.

Optionally, the second collaboration message includes second notification information and/or a second operation result.

That is, the second network management producer entity may directly send the second collaboration message to the first network management producer entity, regardless of whether the second management policy information includes the first sub-action indication information.

In this way, the network management producer entities can automatically perform collaboration and operation and maintenance, accelerate convergence of a closed-loop management process, reduce message exchange between the network management producer entities, and perform real-time coordination without relying on a centrally deployed collaborator (for example, the network management consumer entity), to improve efficiency of implementing an SLS goal of a managed object.

In a possible design, the network management method provided in this embodiment of this application may further include S308: The first network management producer entity sets, based on an assurance goal in the second notification information, configuration information of the first managed object corresponding to the first closed-loop management process.

Optionally, the second notification information is received from the second network management producer entity.

For example, with reference to Table 4, it is assumed that the closed-loop management process 3 is the first closed-loop management process, the network management producer 3 is the first network management producer entity, and the assurance goal corresponding to the closed-loop management process 3 is that a CN-domain throughput is greater than 100 Mbps. If the network management producer entity 3 receives the first notification information 3, and the first notification information 3 includes that a CN-domain throughput corresponding to the closed-loop management process 3 is greater than 90 Mbps, the network management producer entity 3 applies the assurance goal that the CN-domain throughput is greater than 90 Mbps, and adds a CN-domain slice subnet resource, so that the CN-domain throughput is greater than 90 Mbps.

That is, the first network management producer entity and the second network management producer entity may collaborate to implement the assurance goal of the first managed object and/or the assurance goal of the second managed object.

In a possible design, the network management method provided in this embodiment of this application may further include S309: The first network management producer entity sends a second message to the network management consumer entity. Correspondingly, the network management consumer entity receives the second message from the first network management producer entity.

Optionally, the second message may include the first operation result and/or the first modification request information of the first network management producer entity.

For a specific implementation of the first operation result, refer to S301. Details are not described herein again.

Optionally, the first modification request information of the first network management producer entity may be used to request to modify the first management policy information and/or the assurance goal of the first closed-loop management process.

In this way, the network management consumer entity may adjust the management policy information and/or the assurance goal of the first closed-loop management process based on the first operation result and/or the modification request.

For example, the first modification request information of the first network management producer entity may include management policy information and/or an assurance goal of the first closed-loop management process that are/is expected by the first network management producer entity. For example, the first modification request information may include that a latency is less than 3 ms.

In this way, the network management consumer entity may directly use the management policy information and/or the assurance goal included in the first modification request information as the management policy information and/or the assurance goal of the first closed-loop management process; or adjust the management policy information and/or the assurance goal of the first closed-loop management process with reference to the management policy information and/or the assurance goal included in the first modification request information.

It is to be noted that, if the SLS goal of the first managed object has been implemented after the first network management producer entity performs the one or more first management policies in the first management policy information (S303), S309 may not be performed; or S309 may be performed, where the second message includes the first operation result, but does not include the first modification request information of the first network management producer entity.

In some embodiments, the first modification request information of the first network management producer entity may be determined by the first network management producer entity based on the second notification information and/or the second operation result and/or the first operation result.

For specific implementations of the second notification information and the second operation result, refer to S304. Details are not described herein again.

In other words, the first network management producer entity may determine, based on the assurance goal that the network management consumer entity expects the first network management producer entity to use, the second operation result of the second network management producer entity, and/or the first operation result of the first network management producer entity, whether to request to modify the assurance goal and/or the management policy information of the first closed-loop management process, and may further determine the expected assurance goal and/or expected management policy information.

In some embodiments, the second notification information and/or the second operation result may be received by the first network management producer entity from the second network management producer entity.

For example, after receiving the second notification information, the first network management producer entity may directly apply the assurance goal in the first notification information, or may send, to the network management consumer entity, an event of applying the assurance goal in the first notification information.

In a possible design, the network management method provided in this embodiment of this application may further include S310: The second network management producer entity sends a second message to the network management consumer entity. Correspondingly, the network management consumer entity receives the second message from the second network management producer entity.

Optionally, the second message may include a second operation result and/or first modification request information of the second network management producer entity.

Optionally, the first modification request information of the second network management producer entity may be used to request to modify the second management policy information and/or the assurance goal of the second closed-loop management process.

In this way, the network management consumer entity may adjust the management policy information and/or the assurance goal of the second closed-loop management process based on the second operation result and/or the modification request of the second network management producer entity.

For example, the second modification request information of the second network management producer entity may include management policy information and/or an assurance goal of the second closed-loop management process that are/is expected by the second network management producer entity.

In this way, the network management consumer entity may directly use the management policy information and/or the assurance goal included in the first modification request information as the management policy information and/or the assurance goal of the second closed-loop management process; or adjust the management policy information and/or the assurance goal of the second closed-loop management process with reference to the management policy information and/or the assurance goal included in the first modification request information.

In some embodiments, the second network management producer entity may periodically send the second message to the network management consumer entity.

It is to be noted that, if the SLS goal of the second managed object has been implemented after the second network management producer entity performs the one or more second management policies in the second management policy information (S304), S310 may not be performed; or S310 may be performed, where the second message includes the second operation result, but does not include the first modification request information of the second network management producer entity.

In a possible design, the first modification request information of the second network management producer entity is determined by the second network management producer entity based on the first notification information and/or the first operation result and/or the second operation result.

For specific implementations of the first notification information and the first operation result, refer to the implementation in S303. Details are not described herein again. For a specific implementation of the second operation result, refer to the implementation in S304. Details are not described herein again.

In other words, the second network management producer entity may determine, based on the assurance goal that the network management consumer entity expects the second network management producer entity to use, the first operation result of the first network management producer entity, and/or the second operation result of the second network management producer entity, whether to request to modify the assurance goal and/or the management policy information of the second closed-loop management process, and may further determine the expected assurance goal and/or expected management policy information.

In a possible design, the network management method provided in this embodiment of this application may further include S311: The network management consumer entity determines new management policy information and/or a new assurance goal of the closed-loop management process based on a first operation result of at least one network management producer entity and/or first modification request information of the at least one network management producer entity.

Optionally, the new management policy information may include one or more pieces of new management policy information, for example, new first management policy information and/or new second management policy information.

Optionally, the new assurance goal of the closed-loop management process may include a new assurance goal of the first closed-loop management process and/or a new assurance goal of the second closed-loop management process.

For example, with reference to FIG. 2, the first operation result of the at least one network management producer entity may include: a first operation result of the network management producer entity 1 and/or a first operation result of the network management producer entity 2. The first modification request information of the at least one network management producer entity may include: first modification request information of the network management producer entity 1 and/or first modification request information of the network management producer entity 2.

For example, with reference to Table 2, the first notification information of the first sub-action indication information corresponding to the closed-loop management process 1 may be modified to: A RAN-domain latency corresponding to the closed-loop management process 2 is less than 6 ms.

In this way, the network management consumer entity may adjust management policy information and/or assurance goals of one or more closed-loop management processes based on first operation results of one or more network management producer entities and/or the first modification request information of the one or more network management producer entities, so that a corresponding network management producer entity further implements an SLS goal of a corresponding managed object based on the new management policy information and/or the new assurance goal.

Optionally, the network management method provided in this application may support manual optimization or optimization by an external entity for the management policy information and/or the assurance goal. For example, the new management policy information and/or the new assurance goal of the closed-loop management process are/is manually determined based on a first operation result of at least one network management producer entity and/or first modification request information of the at least one network management producer entity.

In a possible design, the network management method provided in this embodiment of this application may further include S312: The network management consumer entity sends new first management policy information and/or a new assurance goal of the first closed-loop management process to the first network management producer entity. Correspondingly, the first network management producer entity receives the new first management policy information and/or the new assurance goal of the first closed-loop management process from the network management consumer entity.

In this way, the first network management producer entity may further implement the SLS goal of the first managed object based on the new management policy information and/or the new assurance goal.

In a possible design, the network management method provided in this embodiment of this application may further include S313: The network management consumer entity sends new second management policy information and/or a new assurance goal of the second closed-loop management process to the second network management producer entity. Correspondingly, the second network management producer entity receives the new second management policy information and/or the new assurance goal of the second closed-loop management process from the network management consumer entity.

In this way, the second network management producer entity may further implement the SLS goal of the second managed object based on the new second management policy information and/or the new assurance goal.

It is to be noted that, if the SLS goal of the first managed object has been implemented after the first network management producer entity performs the one or more first management policies in the first management policy information (S303), S309 may not be performed. If the SLS goal of the second managed object has been implemented after the second network management producer entity performs the one or more second management policies in the second management policy information (S304), S310 may not be performed.

Based on the network management method shown in FIG. 3, the first network management producer entity receives the first management policy information, and performs the one or more first management policies in the first management policy information. The first management policy information is the management policy information corresponding to the first closed-loop management process, there is the association relationship between the first closed-loop management process and the at least one second closed-loop management process, the second closed-loop management process corresponds to the second management policy information, the first management policy information and the at least one piece of second management policy information are for implementing the assurance goal of the first closed-loop management process and the assurance goal of the at least one second closed-loop management process, the first managed object is the resource or the service managed in the first closed-loop management process, the first closed-loop management process is a management process for implementing the SLS goal of the first managed object, the second closed-loop management process is a management process of implementing the SLS goal of the second managed object, and the second closed-loop management process is managed by the second network management producer entity. In this way, the first network management producer entity can implement the SLS goal of the first managed object (for example, a network slice and/or a network slice subnet). This can improve service experience of a user and ensure normal operation of a service.

It is to be noted that FIG. 3 uses an example in which one network management consumer entity determines N pieces of management policy information based on association relationship information and assurance goals of N closed-loop management processes. In some other embodiments, the N pieces of management policy information may be determined by two or more network management consumer entities. For example, a first network management consumer entity and a second network management consumer entity may determine the N pieces of management policy information through negotiation based on the association relationship information and the assurance goals of the N closed-loop management processes.

Optionally, one network management consumer entity may send the N pieces of management policy information to N network management producer entities. For details, refer to S302-1 and S302-2. Alternatively, optionally, a plurality of network management consumer entities may send the N pieces of management policy information to the N network management producer entities. For example, a first network management consumer entity sends first management policy information to a first network management producer entity, and a second network management consumer entity sends second management policy information to a second network management producer entity.

Figure 6:
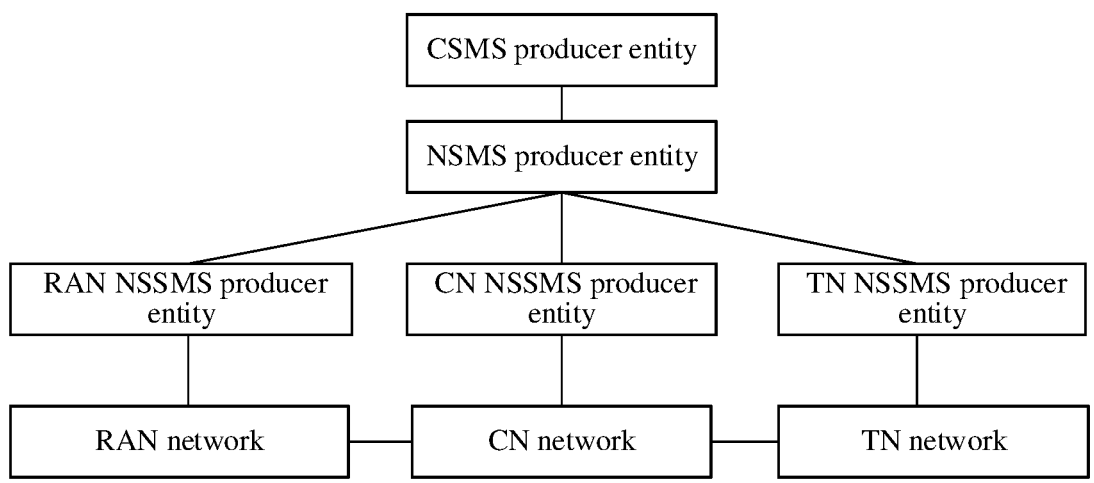
FIG. 6 is a schematic diagram of a network slice management architecture according to an embodiment of this application.
Figure 7:
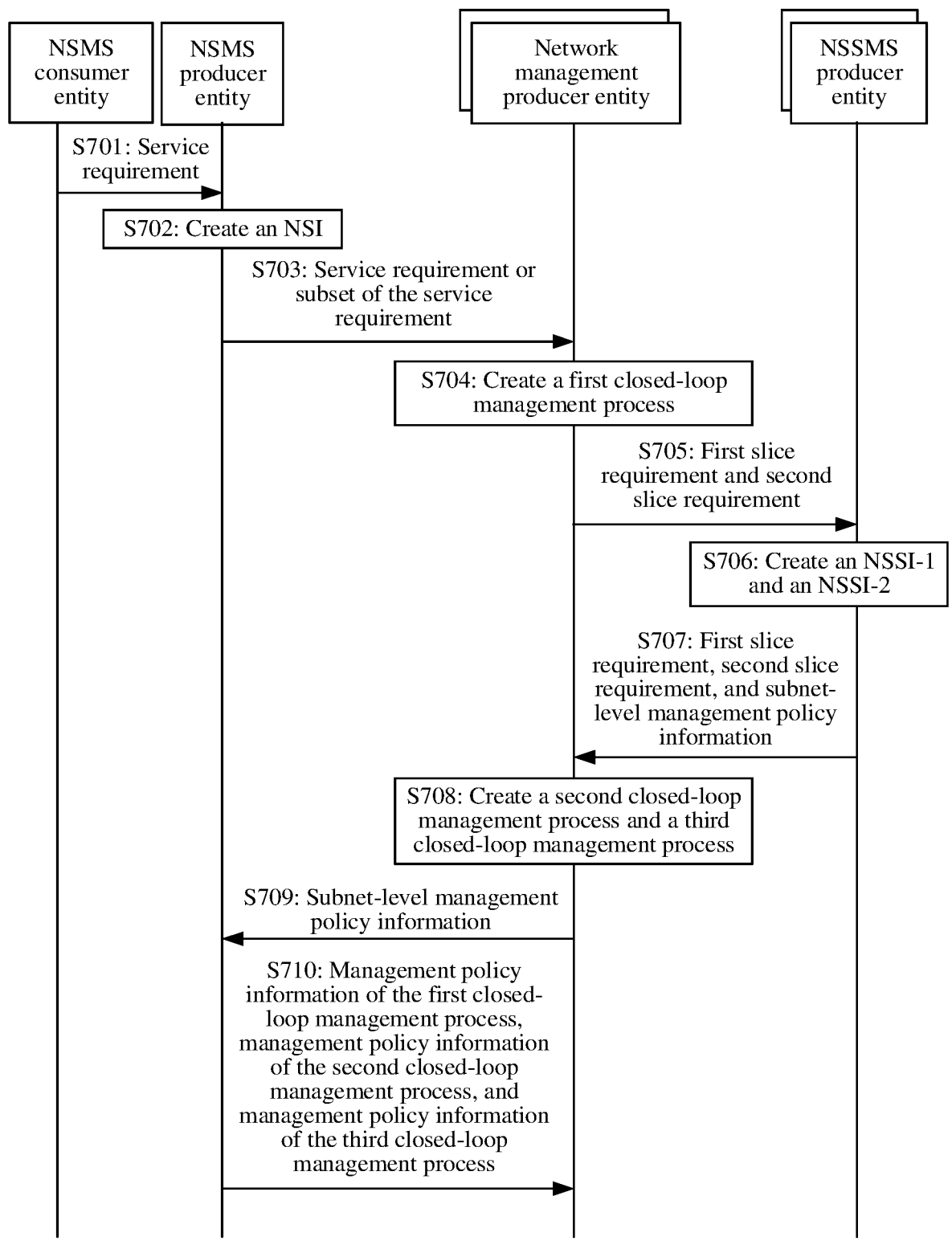
FIG. 7 is a schematic flowchart of another network management method according to an embodiment of this application.

The following describes, with reference to FIG. 6 and FIG. 7, a process of generating management policy information. A network management method shown in FIG. 7 may be used in combination with the network management method shown in FIG. 3.

Network slice-related management functions include a communication service management function (CSMF), a network slice management function (NSMF), and a network slice subnet management function (NSSMF).

A network slice management architecture is shown in FIG. 6. The network slice management architecture may include a communication service management service (CSMS) producer entity, a network slice management service (NSMS) producer entity, and a network slice subnet management service (NSSMS) producer entity. The NSSMS producer entity may include a RAN NSSMS producer entity, a CN NSSMS producer entity, and a TN NSSMS producer entity. The network slice management architecture may further include a CSMS consumer entity, an NSMS consumer entity, and an NSSMS consumer entity (not shown in FIG. 6). The NSMS producer entity manages a life cycle (for example, creation, deletion, and modification) of a network slice instance NSI, performance, an alarm, and the like. The NSSMS producer entity manages a life cycle of a network slice subnet instance NSSI, performance, an alarm, and the like.

In this embodiment of this application, the CSMF and the CSMS producer entity may be equivalently replaced, the NSMF and the NSMS producer entity may be equivalently replaced, and the NSSMF and the NSSMS producer entity may be equivalently replaced.

It is to be noted that in this application, the "producer entity" may be referred to as a "producer", and the "consumer entity" may be referred to as a "consumer". The network management producer entity may be a physical device, and a function of the network management producer entity may be deployed on the physical device. For example, the network management producer entity may be a function module deployed in the physical device.

For example, FIG. 7 is a schematic flowchart of another network management method according to an embodiment of this application. The network management method shown in FIG. 7 mainly describes management policy information generation with reference to FIG. 4, and generated management policy information may be used in the network management method shown in FIG. 3.

Optionally, network management producer entities may include a network slice network management producer entity, a RAN network slice subnet network management producer entity, a CN network slice subnet network management producer entity, and a TN network slice subnet network management producer entity (when the method shown in FIG. 7 is used together with FIG. 4, the TN network slice subnet network management producer entity may not be included). An NSMS producer entity may be a consumer of a network slice network management producer entity, and an NSSMS producer entity may be a consumer of a network slice subnet network management producer entity. For example, a RAN NSSMS producer entity may be a consumer of a RAN network slice subnet network management producer entity, a CN NSSMS producer entity may be a consumer of a CN network slice subnet network management producer entity, and a TN NSSMS producer entity may be a consumer of a TN network slice subnet network management producer entity.

Optionally, a network management producer entity may be an upper-level concept of an entity such as a closed-loop management producer entity (which may be referred to as a closed-loop management producer, a closed-loop management service producer, or the like), an NSMS producer entity, and an NSSMS producer entity. The closed-loop management producer entity, the NSMS producer entity, and the NSSMS producer entity may be different network management producer entities.

For example, the network management producer entity in the method shown in FIG. 7 may be a closed-loop management producer entity. Correspondingly, a network slice network management producer entity may be a network slice closed-loop management producer entity, a RAN network slice subnet network management producer entity may be a RAN network slice subnet closed-loop management producer entity, a CN network slice subnet network management producer entity may be a CN network slice subnet closed-loop management producer entity, and a TN network slice subnet network management producer entity may be a TN network slice subnet closed-loop management producer entity. For another example, the network management producer entity in the method shown in FIG. 3 may be a closed-loop management producer entity. For another example, a network management producer entity in a method shown in FIG. 8 may be a closed-loop management producer entity.

As shown in FIG. 7, the network management method includes the following steps.

S701: An NSMS consumer entity sends a service requirement (service profile) to an NSMS producer entity, to request to create an NSI. Correspondingly, the NSMS producer entity receives the service requirement from the NSMS consumer entity.

For example, the service requirement may include a latency, bandwidth, security, reliability, and the like.

S702: The NSMS producer entity creates the NSI based on the service requirement.

For example, the created NSI may be the NSI in FIG. 4.

S703: The NSMS producer entity sends the service requirement or a subset of the service requirement to a closed-loop management producer entity. Correspondingly, the closed-loop management producer entity receives the service requirement or the subset of the service requirement from the NSMS producer entity.

Optionally, the service requirement or the subset of the service requirement may be used as an assurance goal.

S704: The network management producer entity creates a first closed-loop management process.

Optionally, the first closed-loop management process (which may be referred to as CL1 for short) may support or implement a corresponding closed-loop goal.

For example, the first closed-loop management process may include a step (monitoring, analysis, decision, and execution), a management service, a method, a process, and the like related to closed-loop management and control. For details, refer to the foregoing description of the closed-loop management process.

Optionally, the network management producer entity associates the first closed-loop management process with the NSI as a network slice-level closed-loop management process CL1.

S705: The network management producer entity sends a first slice requirement (slice profile) and a second slice requirement to an NSSMS producer entity. Correspondingly, the NSSMS producer entity receives the first slice requirement and the second slice requirement from the network management producer entity.

Optionally, the first slice requirement may be used to request to create an NSSI-1, and the second slice requirement may be used to request to create an NSSI-2.

In some embodiments, the NSSMS producer entity may include a RAN NSSMS producer entity and a CN NSSMS producer entity.

Optionally, S705 may include: The network management producer entity sends the first slice requirement (slice profile) to the RAN NSSMS producer entity, and sends the second slice requirement to the CN NSSMS producer entity. Correspondingly, the RAN NSSMS producer entity receives the first slice requirement from the network management producer entity, and the CN NSSMS producer entity receives the second slice requirement from the network management producer entity.

Optionally, the network management producer entity may send the service requirement or the subset of the service requirement to the NSSMS producer entity. Correspondingly, the NSSMS producer entity receives the service requirement or the subset of the service requirement from the network management producer entity.

S706: The NSSMS producer entity creates the NSSI-1 and the NSSI-2.

For example, with reference to FIG. 4, the RAN NSSMS producer entity may create the NSSI-1 based on the first slice requirement, and the CN NSSMS producer entity creates the NSSI-2 based on the second slice requirement.

S707: The NSSMS producer entity sends the first slice requirement, the second slice requirement, and subnet-level management policy information to the network management producer entity. Correspondingly, the network management producer entity receives the first slice requirement, the second slice requirement, and the subnet-level management policy information from the NSSMS producer entity.

In some embodiments, the network management producer entity may include a RAN network slice subnet network management producer entity and a CN network slice subnet network management producer entity.

It is to be noted that there may be one network management producer entity, or may be three different network management producer entities respectively corresponding to the NSI, the NSSI-1, and the NSSI-2.

Optionally, S707 may include: The RAN NSSMS producer entity sends the first slice requirement and subnet-level management policy information to the RAN network slice subnet network management producer entity; and the CN NSSMS producer entity sends the second slice requirement and subnet-level management policy information to the CN network slice subnet network management producer entity. Correspondingly, the RAN network slice subnet network management producer entity receives the first slice requirement and the subnet-level management policy information from the RAN NSSMS producer entity, and the CN network slice subnet network management producer entity receives the second slice requirement and the subnet-level management policy information from the CN NSSMS producer entity.

Optionally, the RAN NSSMS producer entity and the CN NSSMS producer entity may determine an association relationship based on the service requirement, an association relationship between the first slice requirement and the second slice requirement, and network composition information, and determine the subnet-level management policy information based on the association relationship.

For example, the subnet-level management policy information may include management policy information corresponding to the NSSI-1 and management policy information corresponding to the NSSI-2.

For example, with reference to FIG. 4, the network composition information may include the NSI, the NSSI-1, and the NSSI-2.

For example, with reference to FIG. 4, the association relationship may include: The NSI includes the NSSI-1 and the NSSI-2, and the NSSI-1 and the NSSI-2 are in a connection relationship.

Optionally, the RAN NSSMS producer entity and the CN NSSMS producer entity may be used as consumer entities of the network management producer entity.

S708: The network management producer entity creates a second closed-loop management process and a third closed-loop management process.

Optionally, the second closed-loop management process and the third closed-loop management process may separately support or implement corresponding assurance goals.

For example, the second closed-loop management process CL2 is associated with the NSSI-1, and the third closed-loop management process CL3 is associated with the NSSI-2. The second closed-loop management process and the third closed-loop management process may be network slice subnet-level closed-loop management processes.

For example, both the second closed-loop management process and the third closed-loop management process may include a step (monitoring, analysis, decision, and execution), a management service, a method, a process, and the like related to closed-loop management and control.

In some embodiments, S708 may include: The RAN network management producer entity creates the second closed-loop management process, and the CN network management producer entity creates the third closed-loop management process.

S709: The network management producer entity sends the subnet-level management policy information to the NSMS producer entity.

S710: The NSMS producer entity sends management policy information of the first closed-loop management process, management policy information of the second closed-loop management process, and management policy information of the third closed-loop management process to the network management producer entity. Correspondingly, the network management producer entity receives the management policy information of the first closed-loop management process, the management policy information of the second closed-loop management process, and the management policy information of the third closed-loop management process from the NSMS producer entity.

Optionally, S710 may include: The NSMS producer entity sends the management policy information of the first closed-loop management process, the management policy information of the second closed-loop management process, and the management policy information of the third closed-loop management process to the network slice network management producer entity, the RAN network slice subnet network management producer entity, and the CN network slice subnet network management producer entity respectively. Correspondingly, the network slice network management producer entity, the RAN network slice subnet network management producer entity, and the CN network slice subnet network management producer entity respectively receive the management policy information of the first closed-loop management process, the management policy information of the second closed-loop management process, and the management policy information of the third closed-loop management process from the NSMS producer entity.

In some embodiments, the method shown in FIG. 7 may further include: The NSMS producer entity determines an association relationship between the first closed-loop management process, the second closed-loop management process, and the third closed-loop management process based on the association relationship between the NSI, the NSSI-1, and the NSSI-2, and generates the management policy information of the first closed-loop management process, the management policy information of the second closed-loop management process, and the management policy information of the third closed-loop management process based on the association relationship between the first closed-loop management process, the second closed-loop management process, and the third closed-loop management process, and the subnet-level management policy information.

Figure 8:
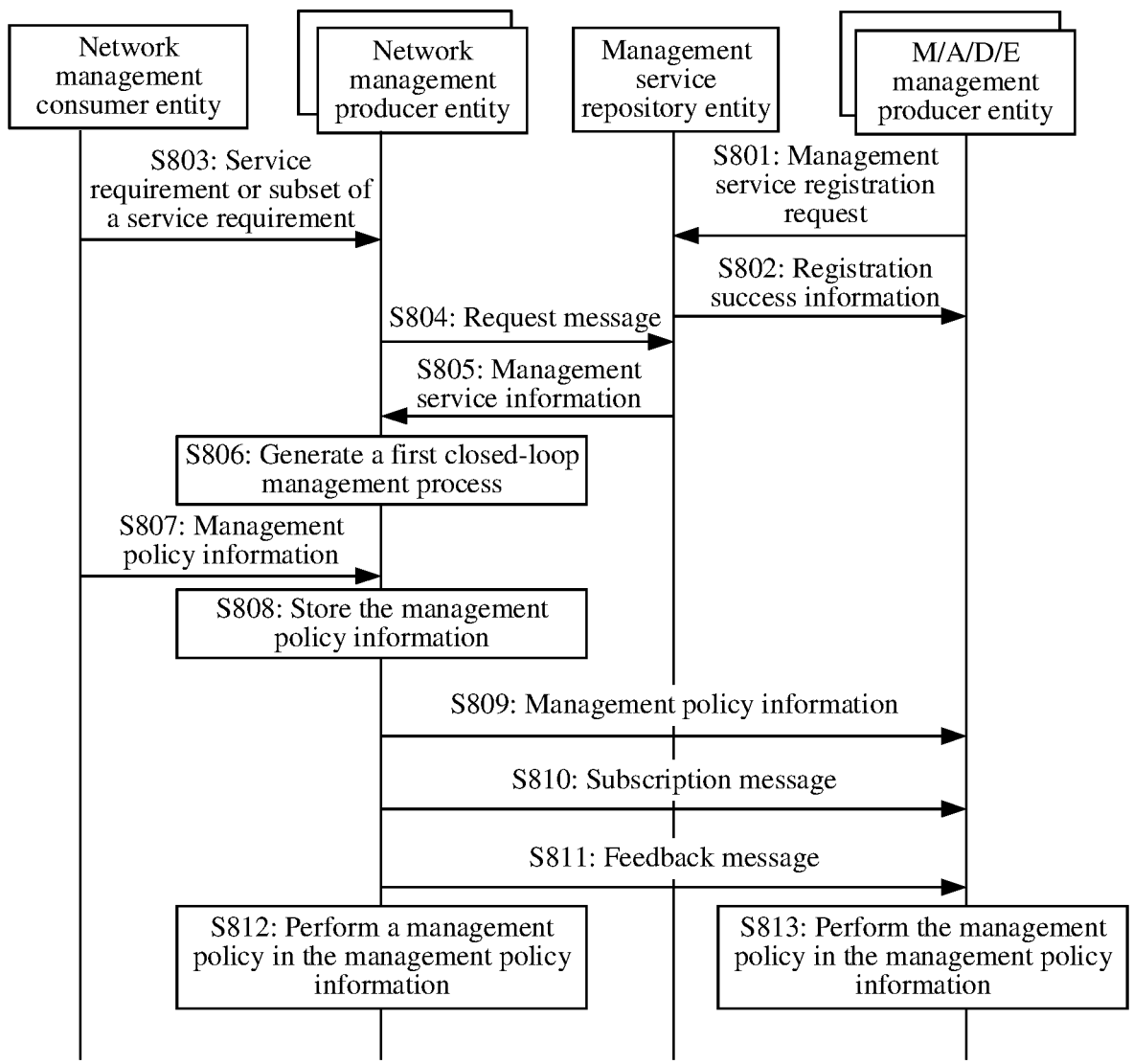
FIG. 8 is a schematic flowchart of another network management method according to an embodiment of this application.

FIG. 8 is a schematic flowchart of another network management method according to an embodiment of this application. The network management method shown in FIG. 8 mainly describes application of management policy information. The network management method shown in FIG. 8 may be used in combination with the network management method shown in FIG. 3 and/or FIG. 7. A network management producer entity may communicate with an M/A/D/E management producer entity through a management service repository entity. The M/A/D/E management producer entity may be short for a monitor management producer entity, an analysis management producer entity, a decision management producer entity, or an execution management producer entity.

It is to be noted that the monitor management producer entity, the analysis management producer entity, the decision management producer entity, the execution management producer entity, and the management service repository entity may be deployed together with the network management producer entity in one physical device, or may be deployed separately from the network management producer entity, or may be partially deployed together with the network management producer entity.

Compared with the network management method shown in FIG. 7, in the network management method shown in FIG. 8, services corresponding to internal monitoring, analysis, decision, and execution in a closed-loop management process are further enabled, corresponding functions are separately performed by the monitor management producer entity, the analysis management producer entity, the decision management producer entity, and the execution management producer entity, and how to perform registration and discovery for the foregoing services by using the management service repository (MnS repository) entity is described. For content included in management policy information, refer to the method shown in FIG. 3. For a manner of generating the management policy information, refer to the method shown in FIG. 7.

S801: The M/A/D/E management producer entity sends a management service registration request to the management service repository entity. Correspondingly, the management service repository entity receives the management service registration request from the M/A/D/E management producer entity.

Optionally, the management service registration request may be used to request to perform management service registration.

For example, a management service is a management service included in a closed loop, for example, monitoring, analysis, decision, and execution.

For example, the management service registration request may include registration information. The registration information may include an identifier of the management service, a unique name of the service, a service port, a service address, and the like. In this way, the management service can be discovered and invoked.

For example, the identifier of the management service may include an identifier of a monitor management service, an identifier of an analysis management service, an identifier of a decision management service, and an identifier of an execution management service.

Optionally, the management service repository (MnS repository) entity may also be referred to as an integration fabric.

S802: The management service repository entity sends registration success information to the M/A/D/E management producer entity. Correspondingly, management services such as M/A/D/E MnSes receive the registration success information from the management service repository entity.

S803: A network management consumer entity sends a service requirement or a subset of a service requirement to one or more network management producer entities. Correspondingly, the network management producer entity receives the service requirement or the subset of the service requirement from the network management consumer entity.

Optionally, the network management consumer entity may include a network slice management consumer entity, a RAN network slice subnet network management consumer entity, a CN network slice subnet network management consumer entity, and a TN network slice subnet network management consumer entity.

Optionally, the network management producer entities may include a network slice network management producer entity, a RAN network slice subnet network management producer entity, a CN network slice subnet network management producer entity, and a TN network slice subnet network management producer entity. The network management producer entity may be a network management consumer entity. For example, the network slice network management producer entity may be a network management consumer entity of a network slice closed-loop management producer.

Optionally, all or some of attributes of the service requirement or the subset of the service requirement may be used as an assurance goal of a closed-loop management process.

S804: The one or more network management producer entities send request messages to the management service repository entity. Correspondingly, the management service repository entity receives the request messages from the one or more network management producer entities.

Optionally, the request message may be used to request management service information, and the management service information may be used to generate a closed-loop management process.

For example, the management service information may include the identifier of the management service, the unique name of the service, the service port, the service address, and the like. For example, the management service information may include an identifier of the M/A/D/E management producer entity, and a name, a port, or an address of the M/A/D/E management producer entity.

S805: The management service repository entity separately sends the management service information to the one or more network management producer entities. Correspondingly, the network management producer entity receives the management service information from the management service repository entity.

S806: The network management producer entity generates a first closed-loop management process based on the management service information.

Optionally, the first closed-loop management process (which may be referred to as CL1 for short) may support or implement an SLS goal of a corresponding managed object.

In some embodiments, the network management producer entity may invoke the M/A/D/E management producer entity by using information such as the identifier of the M/A/D/E management producer entity, and the name, the port, or the address of the M/A/D/E management producer entity.

S807: The network management consumer entity sends management policy information to the network management producer entity. Correspondingly, the network management producer entity receives the management policy information from the network management consumer entity.

It is to be noted that for content included in the management policy information, refer to S301. For a process of generating the management policy information, refer to Embodiment 3. Details are not described herein again.

S808: The network management producer entity stores the management policy information.

S809: The network management producer entity sends corresponding management policy information to the M/A/D/E management producer entity. Correspondingly, the M/A/D/E management producer entity receives the management policy information from the network management producer entity.

For example, the network management producer entity may send management policy information related to monitoring to the M management producer entity, the network management producer entity may send management policy information related to analysis to the A management producer entity, the network management producer entity may send management policy information related to decision to the D management producer entity, and the network management producer entity may send management policy information related to execution to the E management producer entity.

It is to be noted that the network management producer entity may not separately send the corresponding management policy information to the M/A/D/E management producer entity, but the network management producer entity uniformly schedules the management policy information related to monitoring, the management policy information related to analysis, the management policy information related to decision, and the management policy information related to execution.

S810: The network management producer entity sends a subscription message to the M/A/D/E management producer entity. Correspondingly, the M/A/D/E management producer entity receives the subscription message from the network management producer entity.

For example, the subscription message may include but is not limited to one or more of the following: performance, alarm measurement information, analysis information, decision information, and an execution result. In this way, the M/A/D/E management producer entity may send, to the network management producer entity, information that the network management producer entity requests to subscribe to.

S811: The M/A/D/E management producer entity sends a third message to the network management producer entity. Correspondingly, the network management producer entity receives the third message from the M/A/D/E management producer entity.

For example, the third message may include but is not limited to one or more of the following: performance, alarm measurement information, analysis information, decision information, and an execution result.

Optionally, the third message may be determined after the M/A/D/E management producer entity obtains management data based on the subscription message.

For example, the management data may include attribute-related data, alarm data, and the like, for example, throughput-related data and latency-related data.

In some embodiments, the M/A/D/E management producer entity may periodically send the third message.

In some embodiments, the management data may be collected by the monitor management producer entity from a management system of a network element. For example, throughput/latency-related data in a RAN domain is obtained from a RAN management system, and throughput/latency-related data in a CN domain is obtained from a CN management system.

S812: The network management producer entity performs a management policy in the management policy information.

For example, the network management producer entity performs management behavior based on the management policy information, for example, invokes the M/A/D/E management producer entity to perform a corresponding management policy.

For a specific implementation of S812, refer to S303. Details are not described herein again.

S813: The M/A/D/E management producer entity performs the management policy in the management policy information.

Optionally, the M/A/D/E management producer entity may perform a corresponding management policy according to scheduling of the network management producer entity, or the M/A/D/E management producer entity performs a corresponding management policy based on the management policy information received in S809.

For example, the M/A/D/E management producer entity may obtain monitoring data, obtain management data analysis information, make a management decision, perform management behavior, and the like, and may further send an operation result to the network management producer entity.

In this application, unless otherwise specified, for same or similar parts of the embodiments, refer to each other. In embodiments of this application and the implementations/implementation methods in the embodiments, unless otherwise specified or unless a logical conflict occurs, terms and/or descriptions are consistent and may be mutually referenced between different embodiments and between the implementations/implementation methods in the embodiments. Technical features in the different embodiments and the implementations/implementation methods in the embodiments may be combined to form a new embodiment, implementation, or implementation method based on an internal logical relationship thereof. The following implementations of this application are not intended to limit the protection scope of this application.

The network management method provided in embodiments of this application is described in detail above with reference to FIG. 3 to FIG. 8. The network management apparatus provided in embodiments of this application is described below in detail with reference to FIG. 9 and FIG. 10.

Figure 9:
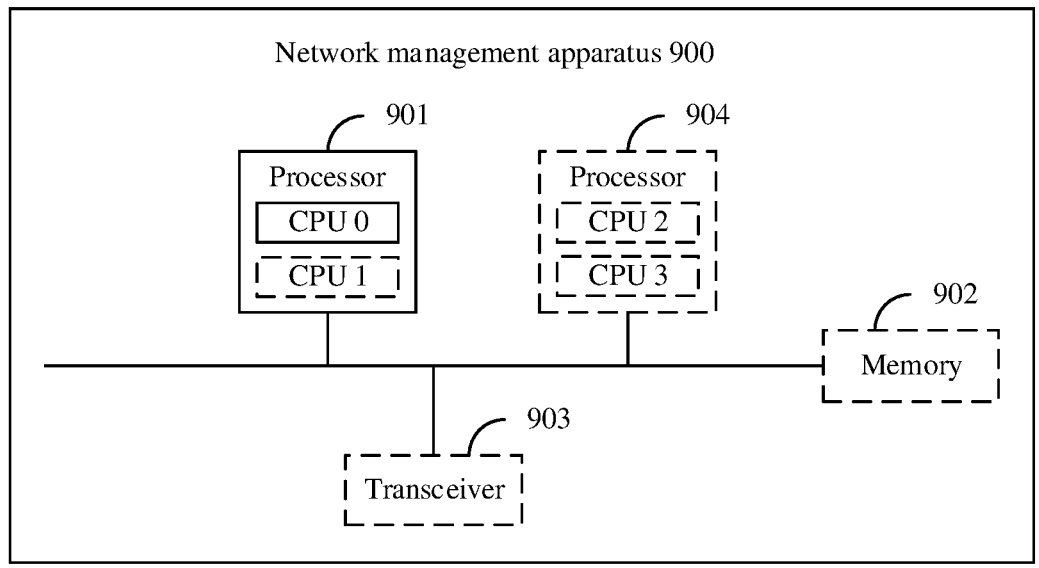
FIG. 9 is a schematic diagram of a structure of a network management apparatus according to an embodiment of this application.

FIG. 9 is a schematic diagram of a structure of a network management apparatus according to an embodiment of this application. The network management apparatus 900 may be a network management producer entity (for example, a first network management producer entity or a second network management producer entity), a network management consumer entity, an NSMS consumer entity, an NSMS producer entity, an NSSMS producer entity, a management service repository entity, or an M/A/D/E management producer entity, or may be a chip used in a network management producer entity, a network management consumer entity, an NSMS consumer entity, an NSMS producer entity, an NSSMS producer entity, a management service repository entity, or an M/A/D/E management producer entity, or another component having a corresponding function. As shown in FIG. 9, the network management apparatus 900 may include a processor 901. Optionally, the network management apparatus 900 may further include one or more of a memory 902 and a transceiver 903. The processor 901 may be coupled, for example, connected through a communication bus, to one or more of the memory 902 and the transceiver 903, or the processor 901 may be independently used.

The following specifically describes each component of the network management apparatus 900 with reference to FIG. 9.

The processor 901 is a control center of the network management apparatus 900, and may be one processor, or may be a collective term of a plurality of processing elements. For example, the processor 901 is one or more central processing units (central processing unit, CPU), or may be an application-specific integrated circuit (ASIC), or may be one or more integrated circuits configured to implement embodiments of this application, for example, one or more microprocessors (digital signal processor, DSP) or one or more field programmable gate arrays (field programmable gate array, FPGA).

The processor 901 may run or execute a software program stored in the memory 902 and invoke data stored in the memory 902, to perform various functions of the network management apparatus 900.

In specific implementation, in an embodiment, the processor 901 may include one or more CPUs, for example, a CPU 0 and a CPU 1 shown in FIG. 9.

In specific implementation, in an embodiment, the network management apparatus 900 may alternatively include a plurality of processors, for example, the processor 901 and a processor 904 shown in FIG. 9. Each of the processors may be a single-core processor (single-CPU) or a multi-core processor (multi-CPU). The processor herein may be one or more communication devices, circuits, and/or processing cores configured to process data (for example, computer program instructions).

Optionally, the memory 902 may be a read-only memory (ROM) or another type of static storage communication device capable of storing static information and instructions, or may be a random access memory (RAM) or another type of dynamic storage communication device capable of storing information and instructions, or may be an electrically erasable programmable read-only memory (EEPROM), a compact disc read-only memory (CD-ROM) or other compact disc storage, optical disc storage (including a compressed optical disc, a laser disc, an optical disc, a digital versatile disc, a Blu-ray disc, or the like), a magnetic disk storage medium or another magnetic storage communication device, or any other medium capable of carrying or storing expected program code in a form of an instruction or a data structure and capable of being accessed by a computer. However, this is not limited. The memory 902 may be integrated with the processor 901, or may exist independently and is coupled to the processor 901 by using an input/output port (not shown in FIG. 9) of the network management apparatus 900. This is not specifically limited in this embodiment of this application.

For example, the input port may be configured to implement a network management producer entity, a network management consumer entity, an NSMS consumer entity, an NSMS producer entity, an NSSMS producer entity, a management service repository entity, or an M/A/D/E management producer entity in any one of the foregoing method embodiments, or may be used for a receiving function performed by a network management producer entity, a network management consumer entity, an NSMS consumer entity, an NSMS producer entity, an NSSMS producer entity, a management service repository entity, or an M/A/D/E management producer entity. The output port may be configured to implement a network management producer entity, a network management consumer entity, an NSMS consumer entity, an NSMS producer entity, an NSSMS producer entity, a management service repository entity, or an M/A/D/E management producer entity in any one of the foregoing method embodiments, or may be used for a sending function performed by a network management producer entity, a network management consumer entity, an NSMS consumer entity, an NSMS producer entity, an NSSMS producer entity, a management service repository entity, or an M/A/D/E management producer entity.

The memory 902 may be configured to store a software program for performing the solution in this application, and the processor 901 controls execution. For a specific implementation, refer to the method embodiments. Details are not described herein again.

Optionally, the transceiver 903 is configured to communicate with another network management apparatus. For example, when the network management apparatus 900 is a network management producer entity, the transceiver 903 may be configured to communicate with a network management consumer entity and/or another network management producer entity. For another example, when the network management apparatus 900 is a network management consumer entity, the transceiver 903 may be configured to communicate with at least two network management producer entities. In addition, the transceiver 903 may include a receiver and a transmitter (not separately shown in FIG. 9). The receiver is configured to implement a receiving function, and the transmitter is configured to implement a sending function. The transceiver 903 may be integrated with the processor 901, or may exist independently and is coupled to the processor 901 by using the input/output port (not shown in FIG. 9) of the network management apparatus 900. This is not specifically limited in this embodiment of this application.

It is to be noted that a structure of the network management apparatus 900 shown in FIG. 9 does not constitute a limitation on the network management apparatus. An actual network management apparatus may include more or fewer components than those shown in the figure, or combine some components, or have different component arrangements.

An action of the network management producer entity (for example, the first network management producer entity or the second network management producer entity) in FIG. 3 to FIG. 8 may be performed by the processor 901 in the network management apparatus 900 shown in FIG. 9 by invoking application program code stored in the memory 902 to instruct the network management producer entity.

An action of the network management consumer entity in FIG. 3 to FIG. 8 may be performed by the processor 901 in the network management apparatus 900 shown in FIG. 9 by invoking the application program code stored in the memory 902 to instruct the network management consumer entity. This is not limited in this embodiment.

An action of the NSMS consumer entity in FIG. 3 to FIG. 8 may be performed by the processor 901 in the network management apparatus 900 shown in FIG. 9 by invoking the application program code stored in the memory 902 to instruct the NSMS consumer entity. This is not limited in this embodiment.

An action of the NSMS producer entity in FIG. 3 to FIG. 8 may be performed by the processor 901 in the network management apparatus 900 shown in FIG. 9 by invoking the application program code stored in the memory 902 to instruct the NSMS producer entity. This is not limited in this embodiment.

An action of the management service repository entity in FIG. 3 to FIG. 8 may be performed by the processor 901 in the network management apparatus 900 shown in FIG. 9 by invoking the application program code stored in the memory 902 to instruct the management service repository entity. This is not limited in this embodiment.

An action of the M/A/D/E management producer entity in FIG. 3 to FIG. 8 may be performed by the processor 901 in the network management apparatus 900 shown in FIG. 9 by invoking the application program code stored in the memory 902 to instruct the M/A/D/E management producer entity. This is not limited in this embodiment.

When the network management apparatus is a network management producer entity (a first network management producer entity or a second network management producer entity), the network management apparatus 900 may perform any one or more possible designs related to the network management producer entity (the first network management producer entity or the second network management producer entity) in the foregoing method embodiments. When the network management apparatus is a network management consumer entity, the network management apparatus 900 may perform any one or more possible designs related to the network management consumer entity in the foregoing method embodiments.

When the network management apparatus is an NSMS consumer entity, the network management apparatus 900 may perform any one or more possible designs related to the NSMS consumer entity in the foregoing method embodiments. When the network management apparatus is an NSMS producer entity, the network management apparatus 900 may perform any one or more possible designs related to the NSMS producer entity in the foregoing method embodiments. When the network management apparatus is an NSSMS producer entity, the network management apparatus 900 may perform any one or more possible designs related to the NSSMS producer entity in the foregoing method embodiments. When the network management apparatus is a management service repository entity, the network management apparatus 900 may perform any one or more possible designs related to the management service repository entity in the foregoing method embodiments. When the network management apparatus is an M/A/D/E management producer entity, the network management apparatus 900 may perform any one or more possible designs related to the M/A/D/E management producer entity in the foregoing method embodiments.

It is to be noted that all related content of each step in the foregoing method embodiment may be cited to a function description of a corresponding function module, and details are not described herein again.

Figure 10:
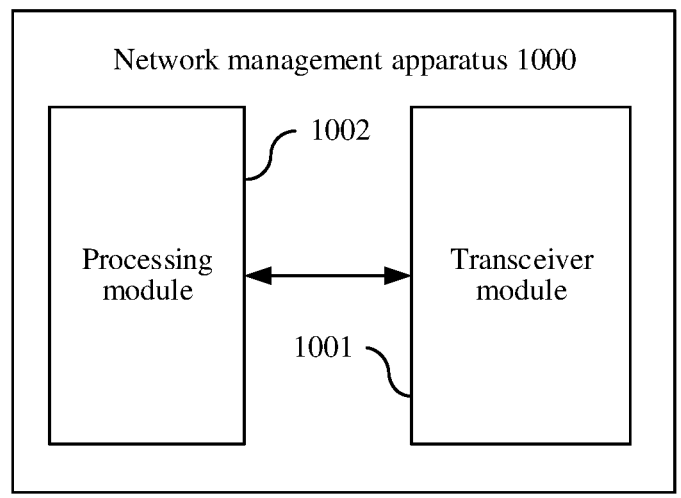
FIG. 10 is a schematic diagram of a structure of another network management apparatus according to an embodiment of this application.

FIG. 10 is a schematic diagram of a structure of another network management apparatus according to an embodiment of this application. For ease of description, FIG. 10 shows only main components of the network management apparatus.

The network management apparatus 1000 includes a transceiver module 1001 and a processing module 1002. The network management apparatus 1000 may be the network management producer entity (for example, the first network management producer entity or the second network management producer entity), the network management consumer entity, the NSMS consumer entity, the NSMS producer entity, the NSSMS producer entity, the management service repository entity, or the M/A/D/E management producer entity in the foregoing method embodiments, or may be used in the network management producer entity, the network management consumer entity, the NSMS consumer entity, the NSMS producer entity, the NSSMS producer entity, the management service repository entity, or the M/A/D/E management producer entity. The transceiver module 1001 may also be referred to as a transceiver unit, and is configured to implement the network management producer entity, the network management consumer entity, the NSMS consumer entity, the NSMS producer entity, the NSSMS producer entity, the management service repository entity, or the M/A/D/E management producer entity in any one of the foregoing method embodiments, or may be used for sending and receiving functions performed by the network management producer entity, the network management consumer entity, the NSMS consumer entity, the NSMS producer entity, the NSSMS producer entity, the management service repository entity, or the M/A/D/E management producer entity.

It is to be noted that the transceiver module 1001 may include a receiving module and a sending module (not shown in FIG. 10). The receiving module is configured to receive data and/or signaling from another device, and the sending module is configured to send data and/or signaling to another device. A specific implementation of the transceiver module is not specifically limited in this application. The transceiver module may include a transceiver circuit, a transceiver machine, a transceiver, or a communication interface.

The processing module 1002 may be configured to implement the network management producer entity (for example, the first network management producer entity or the second network management producer entity), the network management consumer entity, the NSMS consumer entity, the NSMS producer entity, the NSSMS producer entity, the management service repository entity, or the M/A/D/E management producer entity in any one of the foregoing method embodiments, or may be used for a processing function performed by the network management producer entity, the network management consumer entity, the NSMS consumer entity, the NSMS producer entity, the NSSMS producer entity, the management service repository entity, or the M/A/D/E management producer entity. The processing module 1002 may be a processor.

In this embodiment, the network management apparatus 1000 is presented in a form of obtaining each function module through division in an integrated manner. The "module" herein may be a specific ASIC, a circuit, a processor and a memory that execute one or more software or firmware programs, an integrated logic circuit, and/or another component that can provide the foregoing functions. In a simple embodiment, a person skilled in the art may figure out that the network management apparatus 1000 may be in a form of the network management apparatus 900 shown in FIG. 9.

For example, the processor 901 in the network management apparatus 900 shown in FIG. 9 may invoke the computer-executable instructions stored in the memory 902, so that the network management method in the foregoing method embodiments is performed.

Specifically, a function/an implementation process of the transceiver module 1001 and the processing module 1002 in FIG. 10 may be implemented by invoking, by the processor 901 in the network management apparatus 900 shown in FIG. 9, the computer-executable instructions stored in the memory 902. Alternatively, a function/an implementation process of the processing module 1002 in FIG. 10 may be implemented by invoking, by the processor 901 in the network management apparatus 900 shown in FIG. 9, the computer-executable instructions stored in the memory 902, and a function/an implementation process of the transceiver module 1001 in FIG. 10 may be implemented by using the transceiver 903 in the network management apparatus 900 shown in FIG. 9.

Because the network management apparatus 1000 provided in this embodiment may perform the foregoing network management method, for technical effects that can be achieved, refer to the foregoing method embodiments. Details are not described herein again.

In a possible design, the network management apparatus 1000 shown in FIG. 10 is applicable to the network management systems shown in FIG. 1 and FIG. 2, and performs a function of the first network management producer entity in the network management method shown in FIG. 2 to FIG. 5. The network management apparatus 1000 is configured to manage a first closed-loop management process, where the first closed-loop management process is a management process for implementing an SLS goal of a first managed object, the first managed object is a resource or a service managed in the first closed-loop management process, a second closed-loop management process is a management process for implementing an SLS goal of a second managed object, the second closed-loop management process is managed by a second network management producer entity, and the second managed object is a resource or a service managed in the second closed-loop management process.

The transceiver module 1001 is configured to receive a first message from a network management consumer entity. The first message includes first management policy information, the first management policy information is management policy information corresponding to the first closed-loop management process, there is an association relationship between the first closed-loop management process and at least one second closed-loop management process, management policy information corresponding to the second closed-loop management process is second management policy information, the first management policy information and at least one piece of second management policy information are for implementing an assurance goal of the first closed-loop management process and an assurance goal of the at least one second closed-loop management process, and the first management policy information includes one or more first management policies.

The processing module 1002 is configured to perform the one or more first management policies in the first management policy information.

It is to be noted that all related content of each step in the foregoing method embodiment may be cited to a function description of a corresponding function module, and details are not described herein again.

Optionally, the network management apparatus 1000 may further include a storage module (not shown in FIG. 10), and the storage module stores a program or instructions. When the processing module 1002 executes the program or the instructions, the network management apparatus 1000 may perform a function of the first network management producer entity in the network management method shown in FIG. 3 to FIG. 5.

It is to be noted that the network management apparatus 1000 may be the first network management producer entity, or may be a chip (system) or another part or component that can be disposed in the first network management producer entity. This is not limited in this application.

In addition, for technical effects of the network management apparatus 1000, refer to the technical effects of the network management method shown in FIG. 3 to FIG. 5. Details are not described herein again.

In a possible design, the network management apparatus 1000 shown in FIG. 10 is applicable to the network management systems shown in FIG. 1 and FIG. 2, and performs a function of the second network management producer entity in the network management method shown in FIG. 2 to FIG. 5. The network management apparatus 1000 is configured to manage a second closed-loop management process, where the second closed-loop management process is a management process for implementing an SLS goal of a second managed object, the second managed object is a resource or a service managed in the second closed-loop management process, a first closed-loop management process is managed by a first network management producer entity, the first closed-loop management process is a management process for implementing an SLS goal of a first managed object, and the first managed object is a resource or a service managed in the first closed-loop management process.

The transceiver module 1001 is configured to receive a first message from a network management consumer entity. The first message includes second management policy information, the second management policy information is management policy information corresponding to the second closed-loop management process, there is an association relationship between the second closed-loop management process and at least one first closed-loop management process, management policy information corresponding to the first closed-loop management process is first management policy information, the first management policy information and at least one piece of second management policy information are for implementing an assurance goal of the first closed-loop management process and an assurance goal of at least one second closed-loop management process, and the second management policy information includes one or more second management policies.

The processing module 1002 is configured to perform the one or more second management policies in the second management policy information.

It is to be noted that all related content of each step in the foregoing method embodiment may be cited to a function description of a corresponding function module, and details are not described herein again.

Optionally, the network management apparatus 1000 may further include a storage module (not shown in FIG. 10), and the storage module stores a program or instructions. When the processing module 1002 executes the program or the instructions, the network management apparatus 1000 may perform a function of the second network management producer entity in the network management method shown in FIG. 3 to FIG. 5.

It is to be noted that the network management apparatus 1000 may be the second network management producer entity, or may be a chip (system) or another part or component that can be disposed in the second network management producer entity. This is not limited in this application.

In addition, for technical effects of the network management apparatus 1000, refer to the technical effects of the network management method shown in FIG. 3 to FIG. 5. Details are not described herein again.

In another possible design, the network management apparatus 1000 shown in FIG. 10 is applicable to the network management systems shown in FIG. 1 and FIG. 2, and performs a function of the network management consumer entity in the network management method shown in FIG. 3 to FIG. 5.

The processing module 1002 is configured to determine N pieces of management policy information based on association relationship information and assurance goals of N closed-loop management processes. The association relationship information includes an association relationship between the N closed-loop management processes, N is an integer greater than 1, the closed-loop management process is a management process for implementing an SLS goal of a managed object, the managed object is a resource or a service managed in the closed-loop management process, the N pieces of management policy information are for implementing the assurance goals of the N closed-loop management processes, the N closed-loop management processes are in a one-to-one correspondence with N managed objects, and one piece of management policy information includes one or more management policies.

The transceiver module 1001 is configured to send a first message to at least two network management producer entities. The first message includes management policy information, and the network management producer entity is configured to manage a closed-loop management process.

It is to be noted that all related content of each step in the foregoing method embodiment may be cited to a function description of a corresponding function module, and details are not described herein again.

Optionally, the network management apparatus 1000 may further include a storage module (not shown in FIG. 10), and the storage module stores a program or instructions. When the processing module 1002 executes the program or the instructions, the network management apparatus 1000 may perform a function of the network management consumer entity in the network management method shown in FIG. 2 to FIG. 5.

It is to be noted that the network management apparatus 1000 may be the network management consumer entity, or may be a chip (system) or another part or component that can be disposed in the network management consumer entity. This is not limited in this application.

In addition, for technical effects of the network management apparatus 1000, refer to the technical effects of the network management method shown in FIG. 2 to FIG. 5. Details are not described herein again.

In a possible design, the network management apparatus 1000 shown in FIG. 10 is applicable to the network management systems shown in FIG. 1 and FIG. 2, and implements the NSMS consumer entity, the NSMS producer entity, the NSSMS producer entity, the management service repository entity, or the M/A/D/E management producer entity in the network management method shown in FIG. 6 and FIG. 7, or may be used for a function of the network management producer entity, the network management consumer entity, the NSMS consumer entity, the NSMS producer entity, the NSSMS producer entity, the management service repository entity, or the M/A/D/E management producer entity. All related content of each step in the foregoing method embodiment may be cited to a function description of a corresponding function module, and details are not described herein again.

An embodiment of this application provides a network management system. The network management system includes at least two network management producer entities and a network management consumer entity. The at least two network management producer entities may include a first network management producer entity and at least one second network management producer entity. The first network management producer entity is configured to perform an action of the first network management producer entity in the foregoing method embodiments, and the second network management producer entity is configured to perform an action of the second network management producer entity in the foregoing method embodiments. For a specific execution method and process, refer to the foregoing method embodiments. Details are not described herein again.

The network management consumer entity is configured to perform an action of the network management consumer entity in the foregoing method embodiments. For a specific execution method and process, refer to the foregoing method embodiments. Details are not described herein again.

An embodiment of this application provides a chip system. The chip system includes a logic circuit and an input/output port. The logic circuit may be configured to implement a processing function related to the network management method provided in embodiments of this application, and the input/output port may be configured to implement sending and receiving functions related to the network management method provided in embodiments of this application.

For example, the input port may be configured to implement the receiving function related to the network management method provided in embodiments of this application, and the output port may be configured to implement the sending function related to the network management method provided in embodiments of this application.

For example, the processor in the network management apparatus 900 may be configured to perform, for example, but not limited to, baseband-related processing, and the transceiver in the network management apparatus 900 may be configured to perform, for example, but not limited to, radio frequency receiving and sending. The foregoing components may be separately disposed on chips that are independent of each other, or at least some or all of the components may be disposed on a same chip. For example, the processor may be further divided into an analog baseband processor and a digital baseband processor. The analog baseband processor and the transceiver may be integrated on a same chip, and the digital baseband processor may be disposed on an independent chip. With continuous development of integrated circuit technologies, more components may be integrated on a same chip. For example, the digital baseband processor may be integrated on a same chip as a plurality of application processors (for example, but not limited to a graphics processing unit and a multimedia processor). The chip may be referred to as a system on chip. Whether components are independently disposed on different chips or are integrated and disposed on one or more chips usually depends on specific requirements of a product design. Specific implementation forms of the foregoing components are not limited in embodiments of the present invention.

In a possible design, the chip system further includes a memory. The memory is configured to store program instructions and data for implementing a function related to the network management method provided in embodiments of this application.

The chip system may include a chip, or may include a chip and another discrete component.

An embodiment of this application provides a computer-readable storage medium. The computer-readable storage medium includes a computer program or instructions. When the computer program or the instructions is/are run on a computer, the network management method provided in embodiments of this application is performed.

An embodiment of this application provides a computer program product. The computer program product includes a computer program or instructions. When the computer program or the instructions is/are run on a computer, the network management method provided in embodiments of this application is performed.

It can be understood that, the processor in embodiments of this application may be a central processing unit (CPU). The processor may alternatively be another general-purpose processor, a digital signal processor (DSP), an application-specific integrated circuit (ASIC), a field programmable gate array (FPGA) or another programmable logic device, a discrete gate or transistor logic device, a discrete hardware component, or the like. The general-purpose processor may be a microprocessor, or the processor may be any conventional processor or the like.

It can be further understood that the memory in embodiments of this application may be a volatile memory or a nonvolatile memory, or may include both a volatile memory and a nonvolatile memory. The nonvolatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through an example rather than a limitative description, random access memories (random access memory, RAM) in many forms may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

All or some of the foregoing embodiments may be implemented by using software, hardware (for example, a circuit), firmware, or any combination thereof. When software is used to implement embodiments, the foregoing embodiments may be implemented completely or partially in a form of a computer program product. The computer program product includes one or more computer instructions or computer programs. When the computer instructions or computer programs are loaded and executed on a computer, the procedures or functions according to embodiments of this application are all or partially generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive.

It can be understood that the term "and/or" in this specification describes only an association relationship between associated objects, and represents that three relationships may exist. For example, A and/or B may represent the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, "at least one" means one or more, and "a plurality of" means two or more. "At least one of the following items (pieces)" or a similar expression thereof refers to any combination of these items, including a single item (piece) or any combination of a plurality of items (pieces). For example, at least one of a, b, or c may indicate: a, b, c, a-b, a-c, b-c, or a-b-c, where a, b, and c may be singular or plural.

It can be understood that in embodiments of this application, sequence numbers of processes do not mean a sequence of execution. The sequence of execution of the processes is determined according to functions and internal logic of the processes, and should not constitute any limitation on an implementation process of embodiments of this application.

A person of ordinary skill in the art may be aware that, in combination with the examples described in embodiments disclosed in this specification, units and algorithm steps may be implemented by electronic hardware or a combination of computer software and electronic hardware. Whether the functions are implemented by hardware or software depends on specific applications and design constraints of the technical solutions. A person skilled in the art may use different methods to implement the described functions for each particular application, but it should not be considered that the implementation goes beyond the scope of this application.

It may be clearly understood by a person skilled in the art that, for convenience and brevity of description, for a specific working process of the foregoing described system, apparatus, and unit, refer to a corresponding process in the foregoing method embodiments, and details are not described herein again.

In the several embodiments provided in this application, it can be understood that the disclosed system, apparatus, and method may be implemented in other manners. For example, the described apparatus embodiments are merely examples. For example, division into the units is merely logical function division. In actual implementation, there may be another division manner. For example, a plurality of units or components may be combined or integrated into another system, or some features may be ignored or not performed. In addition, the displayed or discussed mutual couplings or direct couplings or communication connections may be implemented through some interfaces, and indirect couplings or communication connections between apparatuses or units may be implemented in an electrical, mechanical, or another form.

The units described as separate parts may or may not be physically separate, and parts displayed as units may or may not be physical units, may be located in one place, or may be distributed on a plurality of network units. Some or all of the units may be selected according to an actual requirement to achieve the objectives of the solutions in the embodiments.

In addition, function units in embodiments of this application may be integrated into one processing unit, or each unit may exist alone physically, or two or more units may be integrated into one unit.

When the function is implemented in a form of a software function unit and sold or used as an independent product, the function may be stored in a computer-readable storage medium. Based on such an understanding, the technical solutions of this application essentially, or the part contributing to the conventional technology, or some of the technical solutions may be implemented in a form of a software product. The computer software product is stored in a storage medium and includes several instructions for instructing a computer device (which may be a personal computer, a server, or a network device) to perform all or some of the steps of the methods described in embodiments of this application. The foregoing storage medium includes any medium that can store program code, such as a USB flash drive, a removable hard disk, a read-only memory (ROM), a random access memory (RAM), a magnetic disk, or an optical disc.

The foregoing descriptions are merely specific implementations of this application. However, the protection scope of this application is not limited thereto. Any change or replacement readily figured out by a person skilled in the art within the technical scope disclosed in this application shall fall within the protection scope of this application. Therefore, the protection scope of this application shall be subject to the protection scope of the claims.

The foregoing descriptions are merely specific implementations of this application. However, the protection scope of this application is not limited thereto. Any change or replacement readily figured out by a person skilled in the art within the technical scope disclosed in this application shall fall within the protection scope of this application. Therefore, the protection scope of this application shall be subject to the protection scope of the claims.

What is claimed is:

1. A network management method, the method comprising:
   receiving a first message from a network management consumer entity, wherein the first message comprises first management policy information,
      the first management policy information being management policy information corresponding to a first closed-loop management process,
      there being an association relationship between the first closed-loop management process and at least one second closed-loop management process,
      management policy information corresponding to the at least one second closed-loop management process being second management policy information,
      the first management policy information and at least one piece of second management policy information are for implementing an assurance goal of the first closed-loop management process and an assurance goal of the at least one second closed-loop management process, and
      the first management policy information comprising one or more first management policies; and
   performing the one or more first management policies in the first management policy information; and
   wherein a first network management producer entity is configured to manage the first closed-loop management process, the first closed-loop management process is a management process for implementing a service level specification (SLS) goal of a first managed object, the first managed object is a resource or a service managed in the first closed-loop management process, a second closed-loop management process is a management process for implementing an SLS goal of a second managed object, the second closed-loop management process is managed by a second network management producer entity, and the second managed object is a resource or a service managed in the second closed-loop management process.

2. The network management method according to claim 1, wherein the first management policy information further comprises one or more pieces of first action indication information, and the one or more pieces of first action indication information indicates a first network management producer entity to set configuration information of the first managed object corresponding to the first closed-loop management process.

3. The network management method according to claim 2, wherein the first management policy information further comprises one or more pieces of condition information or one or more pieces of event information, and wherein one piece of condition information corresponds to at least one piece of first action indication information, and one piece of event information corresponds to at least one piece of first action indication information.

4. The network management method according to claim 2, wherein the performing the one or more first management policies in the first management policy information comprises:
   setting, based on the one or more pieces of first action indication information, the configuration information of the first managed object corresponding to the first closed-loop management process.

5. The network management method according to claim 3, wherein the performing the one or more first management policies in the first management policy information comprises: in response to determining that the one or more pieces of condition information or the one or more pieces of event information are satisfied, setting, based on the at least one piece of first action indication information, the configuration information of the first managed object corresponding to the first closed-loop management process.

6. The network management method according to claim 1, wherein the first message further comprises: an identifier of the second network management producer entity, an identifier of the second closed-loop management process, or the assurance goal of the first closed-loop management process.

7. The network management method according to claim 6, wherein the first management policy information further comprises one or more pieces of first sub-action indication information, the one or more pieces of first sub-action indication information indicate the first network management producer entity to send first notification information or a first operation result to the second network management producer entity, and wherein the performing the one or more first management policies in the first management policy information comprises:
   sending a first collaboration message to the second network management producer entity based on the identifier of the second network management producer entity and the one or more pieces of first sub-action indication information, wherein the first collaboration message comprises the first notification information or the first operation result,
   wherein the first notification information comprises the assurance goal of the second closed-loop management process and that the network management consumer entity expects the second network management producer entity to use, and the first operation result is obtained by the first network management producer entity based on first action indication information, or the first operation result is obtained by the first network management producer entity based on the first action indication information and one or more of condition information and event information.

8. The network management method according to claim 2, wherein the method further comprises:
   sending a second message to the network management consumer entity, wherein the second message comprises a first operation result or first modification request information,
   wherein the first operation result is obtained by the first network management producer entity based on the one or more pieces of first action indication information, or the first operation result is obtained by the first network management producer entity based on the one or more pieces of first action indication information and one or more of condition information and event information, and the first modification request information is used to request to modify the first management policy information or the assurance goal of the first closed-loop management process.

9. The network management method according to claim 8, wherein the first modification request information is determined by the first network management producer entity based on second notification information or a second operation result, the second notification information comprises the assurance goal of the first closed-loop management process that the network management consumer entity expects the first network management producer entity to use, and the second operation result is obtained by the second network management producer entity based on the one or more pieces of first action indication information, or the second operation result is obtained by the second network management producer entity based on the one or more pieces of first action indication information and one or more of condition information and event information.

10. The network management method according to claim 9, wherein the method further comprises:
receiving a second collaboration message from the second network management producer entity, wherein the second collaboration message comprises the second notification information or the second operation result.

11. The network management method according to claim 7, wherein the first operation result comprises: a first performance result, an identifier of first management policy information corresponding to the first performance result, condition information corresponding to the first performance result, event information corresponding to the first performance result, and first action indication information corresponding to the first performance result, wherein the first performance result comprises a result of performance of a first managed object.

12. The network management method according to claim 1, wherein the association relationship comprises a connection relationship, an inclusion relationship, or a sharing relationship.

13. A network management method comprising:
determining N pieces of management policy information based on association relationship information and assurance goals of N closed-loop management processes, wherein
  the association relationship information comprises an association relationship between the N closed-loop management processes,
  N is an integer greater than 1,
  each closed-loop management process is a management process for implementing a service level specification (SLS) goal of a corresponding managed object,
  each managed object is a resource or a service managed in a corresponding closed-loop management process,
  the N pieces of management policy information are for implementing the assurance goals of the N closed-loop management processes,
  the N closed-loop management processes are in a one-to-one correspondence with N managed objects, and
  one piece of management policy information comprises one or more management policies; and
sending a first message to at least two network management producer entities, wherein each first message comprises at least one piece of management policy information, and each network management producer entity is configured to manage a corresponding closed-loop management process; and
wherein the at least two network management producer entities comprise a first network management producer entity and a second network management producer entity, the first network management producer entity is configured to manage a first closed-loop management process, the first closed-loop management process is a management process for implementing a service level specification (SLS) goal of a first managed object, the first managed object is a resource or a service managed in the first closed-loop management process, a second closed-loop management process is a management process for implementing an SLS goal of a second managed object, the second closed-loop management process is managed by a second network management producer entity, and the second managed object is a resource or a service managed in the second closed-loop management process.

14. The network management method according to claim 13, wherein each piece of management policy information further comprises one or more pieces of first action indication information, and each piece of first action indication information indicates to a receiving network management producer entity to set configuration information of the managed object corresponding to the corresponding closed-loop management process.

15. The network management method according to claim 14, wherein the at least one piece of management policy information further comprises one or more pieces of condition information or one or more pieces of event information, and wherein one piece of condition information corresponds to at least one piece of first action indication information, and wherein one piece of event information corresponds to at least one piece of first action indication information.

16. The network management method according to claim 13, wherein the first message further comprises one or more of the following: an identifier of the second network management producer entity, an identifier of the second closed-loop management process, and the assurance goal of the first closed-loop management process.

17. The network management method according to claim 16, wherein the at least one piece of management policy information further comprises one or more pieces of first sub-action indication information, the one or more pieces of first sub-action indication information indicate the first network management producer entity to send first notification information or a first operation result to the second network management producer entity,
wherein the first notification information comprises the assurance goal of the second closed-loop management process that a network management consumer entity expects the second network management producer entity to use, and the first operation result is obtained by the first network management producer entity based on first action indication information, or the first operation result is obtained by the first network management producer entity based on the first action indication information and one or more of condition information and event information.

18. The network management method according to claim 13, wherein the method further comprises:
receiving a second message from a third network management producer entity, wherein the second message comprises a first operation result or first modification request information,
wherein the first operation result is obtained by the third network management producer entity based on first action indication information, or the first operation result is obtained by the third network management producer entity based on the first action indication information and one or more of condition information and event information, and the first modification request information is used to request to modify a corresponding piece of management policy information or an assurance goal of a corresponding closed-loop management process.

19. The network management method according to claim 18, wherein the method further comprises:
determining new management policy information or a new assurance goal of the closed-loop management process based on a first operation result of at least one network management producer entity or first modification request information of the at least one network management producer entity.

20. An apparatus comprising:
at least one processor coupled to at least one memory, the at least one processor being configured to execute instructions stored in the at least one memory, and wherein the instructions, when executed by the at least one processor, enable the apparatus to:
  determine N pieces of management policy information based on association relationship information and assurance goals of N closed-loop management processes, wherein
    the association relationship information comprises an association relationship between the N closed-loop management processes,
    N is an integer greater than 1,
    each closed-loop management process is a management process for implementing a service level specification SLS goal of a managed object,
    the managed object is a resource or a service managed in a corresponding closed-loop management process,
    the N pieces of management policy information are for implementing the assurance goals of the N closed-loop management processes,
    the N closed-loop management processes are in a one-to-one correspondence with N managed objects, and
    one piece of management policy information comprises one or more management policies; and
  send a first message to at least two network management producer entities, wherein the first message comprises the management policy information, and each network management producer entity is configured to manage a corresponding closed-loop management process; and
wherein the at least two network management producer entities comprise a first network management producer entity and a second network management producer entity, the first network management producer entity is configured to manage a first closed-loop management process, the first closed-loop management process is a management process for implementing a service level specification (SLS) goal of a first managed object, the first managed object is a resource or a service managed in the first closed-loop management process, a second closed-loop management process is a management process for implementing an SLS goal of a second managed object, the second closed-loop management process is managed by a second network management producer entity, and the second managed object is a resource or a service managed in the second closed-loop management process.

* * * * *